United States Patent
Beibei et al.

(10) Patent No.: US 9,215,652 B2
(45) Date of Patent: Dec. 15, 2015

(54) METHOD AND DEVICE FOR COMPENSATION AND RESTORING OF COVERAGE AREA

(75) Inventors: Jia Beibei, Beijing (CN); Li Chen, Beijing (CN); Dajun Zhang, Beijing (CN); Ying Wang, Beijing (CN); Guoqing Li, Beijing (CN)

(73) Assignees: DATANG MOBILE COMMUNICATIONS EQUIPMENT CO., LTD, Beijing (CN); SHANGHAI DATANG MOBILE COMMUNICATIONS EQUIPMENT CO., LTD, Shanghai (CN)

( * ) Notice: Subject to any disclaimer, the term of this patent is extended or adjusted under 35 U.S.C. 154(b) by 137 days.

(21) Appl. No.: 13/978,389

(22) PCT Filed: Jan. 6, 2012

(86) PCT No.: PCT/CN2012/070107
§ 371 (c)(1), (2), (4) Date: Jul. 16, 2013

(87) PCT Pub. No.: WO2012/092876
PCT Pub. Date: Jul. 12, 2012

(65) Prior Publication Data
US 2013/0286917 A1    Oct. 31, 2013

(30) Foreign Application Priority Data
Jan. 6, 2011   (CN) .......................... 2011 1 0002095

(51) Int. Cl.
*H04W 52/02*    (2009.01)
(52) U.S. Cl.
CPC .......... *H04W 52/02* (2013.01); *H04W 52/0206* (2013.01); *Y02B 60/50* (2013.01)

(58) Field of Classification Search
CPC ......................... H04W 52/02; H04W 52/0206
USPC .......................................... 370/311, 312, 313
See application file for complete search history.

(56) References Cited

U.S. PATENT DOCUMENTS

| | | | |
|---|---|---|---|
| 2005/0062673 A1* | 3/2005 | Wu et al. | 343/872 |
| 2013/0053051 A1* | 2/2013 | Fang et al. | 455/452.1 |

FOREIGN PATENT DOCUMENTS

| | | |
|---|---|---|
| CN | 101938820 A | 1/2011 |
| CN | 102065448 A | 5/2011 |
| WO | 2010078674 A1 | 7/2010 |

OTHER PUBLICATIONS

International Search Report for PCT/CN2012/070107.
(Continued)

*Primary Examiner* — Mohammad Anwar
(74) *Attorney, Agent, or Firm* — Kilpatrick Townsend & Stockton LLP

(57) ABSTRACT

Disclosed is a method for compensation and restoring of a coverage area, for realizing energy saving and compensation between nodes. The coverage compensation method includes: judging whether or not the trigger condition for starting an energy saving and compensation process is satisfied according to a preset energy saving and compensation strategy; when the trigger condition for starting the energy saving and compensation process is satisfied, one of a first node and a second node carries out an energy saving operation in the energy saving and compensation process while the other node carries out a compensation operation in the energy saving and compensation process; wherein the first node is a compensation node and the second node is an energy saving node, or the first node is an energy saving node and the second node is a compensation node. Further disclosed is a device for implementing the method.

20 Claims, 20 Drawing Sheets

(56) References Cited

OTHER PUBLICATIONS

3GPP TR 36.927 1.0.0(Nov. 2010), 3rd Generation Partnership Project, Technical Specification Group Radio Access Networks, Evolved Universal Terrestrial Radio Access (E-UTRA), Potential solutions for energy saving for E-UTRAN (Release 10), 19 pages.

Proposed Description for Inter-eNB Energy Saving, 3GPP TSG RAN WG3 Meeting #69, Madri, Spain, Aug. 23-27, 2010, 5 pages.

3GPP TR 32.826 V10.0.0 (Mar. 2010), 3rd Generation Partnership Project, Technical Specification Group Services and System Aspects, Telecommunication management, Study on Energy Savings Management (ESM) (Release 10), 33 pages.

* cited by examiner

METHOD AND DEVICE FOR COMPENSATION AND RESTORING OF COVERAGE AREA

This application is a US National Stage of International Application No. PCT/CN2012/070107, filed Jan. 6, 2012, designating the United States, and claiming the benefit of Chinese Patent Application No. 201110002095.7, filed with the Chinese Patent Office on Jan. 6, 2011 and entitled "Coverage area compensation and restoration method and apparatus", both of which are hereby incorporated by reference in their entireties.

FIELD

The present invention relates to the field of communications and particularly to a coverage area compensation and restoration method and apparatus.

BACKGROUND

Along with the dramatic economic and social development, people have ignored or disregarded negative effects due to their excessive pursuing of the satisfactory development and the development pace, and numerous hidden dangers have been concealed for their future development despite their extremely satisfied material desires, so that these problems, e.g., an greenhouse effect, water pollution, etc., will be increasingly prominent over time until human survival is endangered. To some extent, all of these problems may be attributable to people's incomplete understanding of their development that any problem would be readily solved as long as their economic development could be attained, thus ignoring environmental protection. In fact, the problems faced by the human being can be constantly solved only by their scientific development. Thus energy-saving and emission reduction and a low-carbon lifestyle have become hotspots of social interest.

Those skilled in the art of communications have identified this issue and conceived energy-saving of communication devices.

However there has been absent so far an effective solution to how to control an energy-saving cell to be deactivated and to enlarge a coverage area of a compensation cell.

SUMMARY

Embodiments of the invention provide a coverage area compensation and restoration method and apparatus so as to perform energy-saving and compensation between the nodes.

A coverage area compensation method includes the steps of:

determining from preset energy-saving and compensation strategies whether a trigger condition to initiate an energy-saving and compensation process is satisfied; and a first erode performing an energy-saving operation in the energy-saving and compensation process and a second node performing a compensation operation in the energy-saving and compensation process when the trigger condition to initiate the energy-saving and compensation process is satisfied.

A coverage area restoration method includes the steps of:

determining from preset energy-saving and compensation restoration strategies whether a trigger condition to initiate a coverage restoration process is satisfied; and a first node performing an energy-saving restoration operation in the coverage restoration process find a second node performing a compensation restoration operation in the coverage restoration process when the trigger condition to initiate the coverage restoration process is satisfied.

A coverage area compensation apparatus includes:

a strategy module configured to determine from preset energy-saving and compensation strategies whether a trigger condition to initiate an energy-saving and compensation process is satisfied or to receive a trigger for the energy-saving and compensation process from an Operation, Administration and Maintenance, OAM, entity; and an enforcement module configured to perform an energy-saving operation in the energy-saving and compensation process or to perform a compensation operation in the energy-saving and compensation process when the energy-saving and compensation process is determined to be initiated, wherein the apparatus is an energy-saving node when performing the energy-saving operation in the energy-saving and compensation process; and the apparatus is a compensation node when performing the compensation operation in the energy-saving and compensation process.

A coverage area restoration apparatus includes:

a strategy module configured to determine from preset energy-saving and compensation restoration strategies whether a trigger condition to initiate a coverage restoration process is satisfied or to receive a trigger for the coverage restoration process from an Operation, Administration and Maintenance, OAM, entity; and an enforcement module configured to perform an energy-saving restoration operation in the coverage restoration process or a compensation restoration operation in the coverage restoration process when the coverage restoration process is determined to be initiated, wherein the apparatus is an energy-saving node when performing the energy-saving restoration operation in the coverage restoration process; and the apparatus is a compensation node when performing the compensation restoration operation in the coverage restoration process.

An Operation, Administration and Maintenance, OAM, apparatus includes:

a strategy module configured to determine from preset energy-saving and compensation strategies whether a trigger condition to initiate an energy-saving and compensation process is satisfied; and a interface module configured to trigger a first node and a second node to perform the energy-saving and compensation process when the energy-saving and compensation process is determined to be initiated, wherein the first node is a compensation node, and the second node is an energy-saving node; or the first node is an energy-saving node, and the second node is a compensation node.

An Operation, Administration and Maintenance, OAM, apparatus includes:

a strategy module configured to determine from preset energy-saving and compensation restoration strategies whether a trigger condition to initiate a coverage restoration process is satisfied; and an interface module configured to trigger a first node and a second node to perform an energy-saving and compensation restoration process when the coverage restoration process is determined to be initiated, wherein the first node is a compensation node, and the second node is an energy-saving node; or the first node is an energy-saving node, and the second node is a compensation node.

A node in an embodiment of the invention sends a compensation request to another related node when an energy-saving or compensation strategy is satisfied so that the node sending the request and the another related node perform an energy-saving or compensation operation to implement energy-saving and compensation between the nodes.

DETAILED DESCRIPTION OF THE EMBODIMENTS

Figure 1:
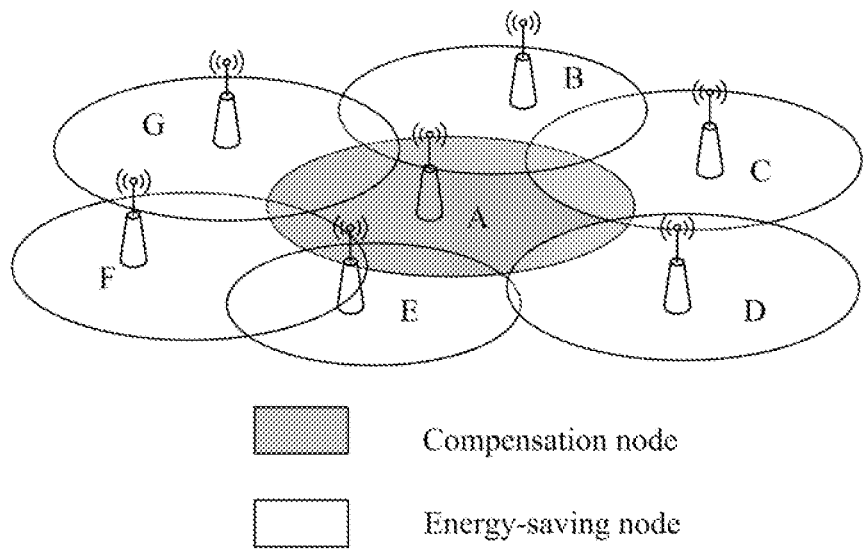
FIG. 1 is a schematic diagram of adjacent cells in the prior art.

A node in an embodiment of the invention sends a compensation request to another related node when an energy-saving or compensation strategy is satisfied so that the node sending the request and the another related node perform an energy-saving or compensation operation to implement energy-saving and compensation between the nodes. Referring to FIG. 1, cells A to G of an Evolved Universal Terrestrial Radio Access Network (E-UTRAN) abut each other without overlapping coverage, that is, the E-UTRAN network has single-layer coverage. Particularly the cell A has a coverage compensation function, and the cells B to G have an energy-saving function. During a low-service period (e.g., late at night), the E-UTRAN cells B to G are deactivated for energy-saving, and the cell A acting as a compensation node enlarges its coverage area and provides essential service coverage of this region, thus avoiding a coverage hole arising from deactivation of the energy-saving cells and ensuring continuity of Long Term Evolution (LTE) coverage.

Figure 2:
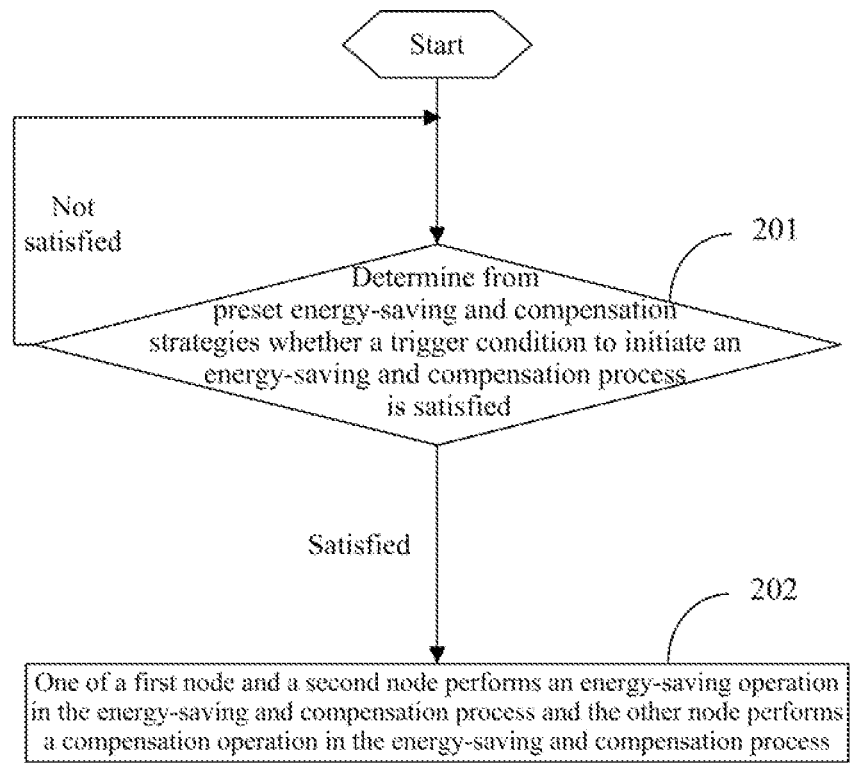
FIG. 2 is a general flow chart of a coverage area compensation method in an embodiment of the invention.

Referring to FIG. 2, a general flow of a coverage area compensation method in this embodiment is as follows:

Step 201: It is determined from preset energy-saving and compensation strategies whether a trigger condition to initiate an energy-saving and compensation process is satisfied.

Step 202: When the trigger condition to initiate the energy-saving and compensation process is satisfied, one of a first node and a second node performs an energy-saving operation in the energy-saving and compensation process and the other node performs a compensation operation in the energy-saving and compensation process; otherwise, the step 201 is repeated.

Particularly the first node is a compensation node, and the second node is an energy-saving node; or the first node is an energy-saving node, and the second node is a compensation node. And the step 201 can be performed by the compensation node or the energy-saving node or can be performed by a third-party OAM entity. And the compensation node and the energy-saving node can trigger and negotiate about the energy-saving and compensation operations in numerous ways. In this embodiment, the compensation node enforces the compensation strategy among the energy-saving and compensation strategies, and the energy-saving node enforces the energy-saving strategy among the energy-saving and compensation strategies. An implementation process will be introduced below in details in several embodiments.

Figure 3:
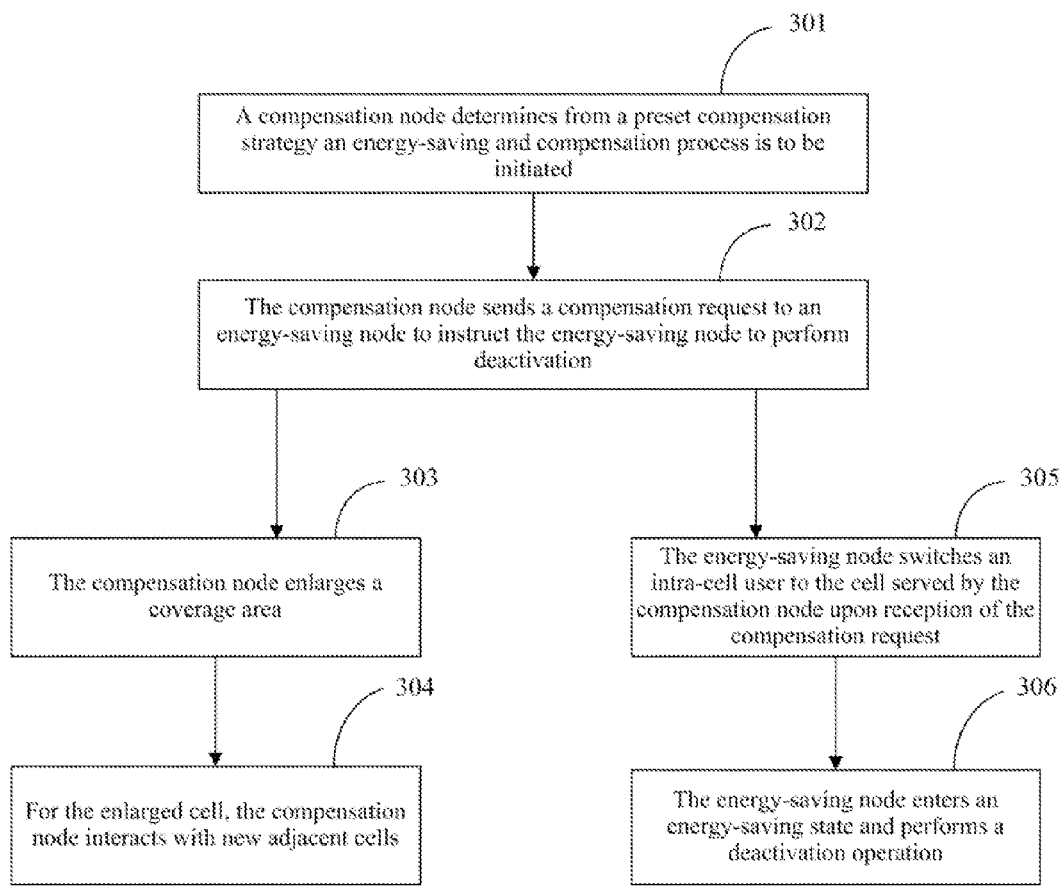
FIG. 3 is a flow chart of a method of a compensation node initiating energy-saving and compensation in a forced process in an embodiment of the invention.

Referring to FIG. 3, a flow of a method of a compensation node initiating energy-saving and compensation in a forced process in this embodiment is as follows:

Step 301: A compensation node determines from a preset compensation strategy an energy-saving and compensation process is to be initiated. Numerous preset compensation strategies are possible, for example, a preset point of time is reached, e.g., 11:00 p.m. Other compensation strategies are also possible and will not be enumerated here so as to avoid a repeated description thereof, and any compensation strategy with an energy-saving and compensation process to be initiated can be applicable to this embodiment. Particularly the compensation strategy can be preconfigured by an Operation, Administration and Maintenance (OAM) entity or can be exchanged between cells.

Step 302: The compensation node sends a compensation request to an energy-saving node to instruct the energy-saving node to perform deactivation. The compensation request can particularly be a cell compensation indication. The cell compensation indication carries the identifiers of target cells to be deactivated and can further include a minimum period of time after which a target cell is deactivated, that is, the target cell will not be deactivated until the end of this period of time and will be deactivated after a time which is no shorter than this period of time so that the compensation node has sufficient time to cover the target cell so as to reduce or avoid a coverage hole from occurring. The compensation node can send a cell compensation indication to all the adjacent energy-saving nodes concurrently, and then the cell compensation indication carries the identifiers of cells served by all the adjacent energy-saving nodes. Alternatively the compensation node sends cell compensation indications separately to respective adjacent energy-saving nodes, and then the cell compensation indication for each energy-saving node carries the identifiers of cells served by the energy-saving node.

Step 303: The compensation node enlarges a coverage area. For example, a particular operation is to boost transmission power, to adjust an inclination angle of an antenna, etc.

Step 304: For the enlarged cell, the compensation node interacts with new adjacent cells and collects RLF and other related information of the new adjacent cells so as to further adjust transmission power and optimize the coverage area.

Step 305: The energy-saving node switches an intra-cell user to the cell served by the compensation node upon reception of the compensation request. If there is an accessing user served by the energy-saving node, then this step will be performed; otherwise, this step will be skipped.

Step 306: The energy-saving node enters an energy-saving state and performs a deactivation operation. Numerous deactivation operations are possible, e.g., to deactivate transmission. Preferably the energy-saving node reserves only a sounding function so as to receive an energy-saving state quit instruction.

Particularly a process of the steps 303 and 304 and a process of the steps 305 and 306 are two separate processes and can be performed in synchronization.

In this embodiment, if there is an X2 interface between the compensation node and the energy-saving node, then the compensation node can send the cell compensation indication to the energy-saving node via the X2 interface, and an example of the structure of the cell compensation indication is as depicted in Table 1. If there is no X2 interface between the compensation node and the energy-saving node or there is an inter-RAT scenario between the compensation node and the energy-saving node, then the cell compensation indication will be forwarded by a device in a Core Network (CN) to the energy-saving node, and at this time an example of the structure of the cell compensation indication is as depicted in Table 2, and simply the device in the core network can transparently transmit the cell compensation indication directly.

TABLE 1

| Information Element (IE)/Group Name | Value range | Description |
| --- | --- | --- |
| Message Type Served Cells To Compensate | 1 to maxCellineNB, i.e., the maximum identifier of cells served by a NodeB | Indicate target cells requested to be deactivated |
| >Evolved Cell Global Identifier (ECGI) | | Indicate the identifier of a cell |
| Time to wait | | Indicate a minimum period of time after which a target cell is allowed to be deactivated |

TABLE 2

| IE/Group Name | Presence | Range | IE type and reference | Semantics description |
| --- | --- | --- | --- | --- |
| CHOICE Energy-saving Application) | Must (M) | | | |
| >Served Cells To Compensate | | | | Indicate target cells requested to be deactivated |
| >>ECGI | M | | | |
| >Time to wait | Optional (O) | | | Indicate a minimum period of time after which a target cell is allowed to be deactivated |

Figure 4:
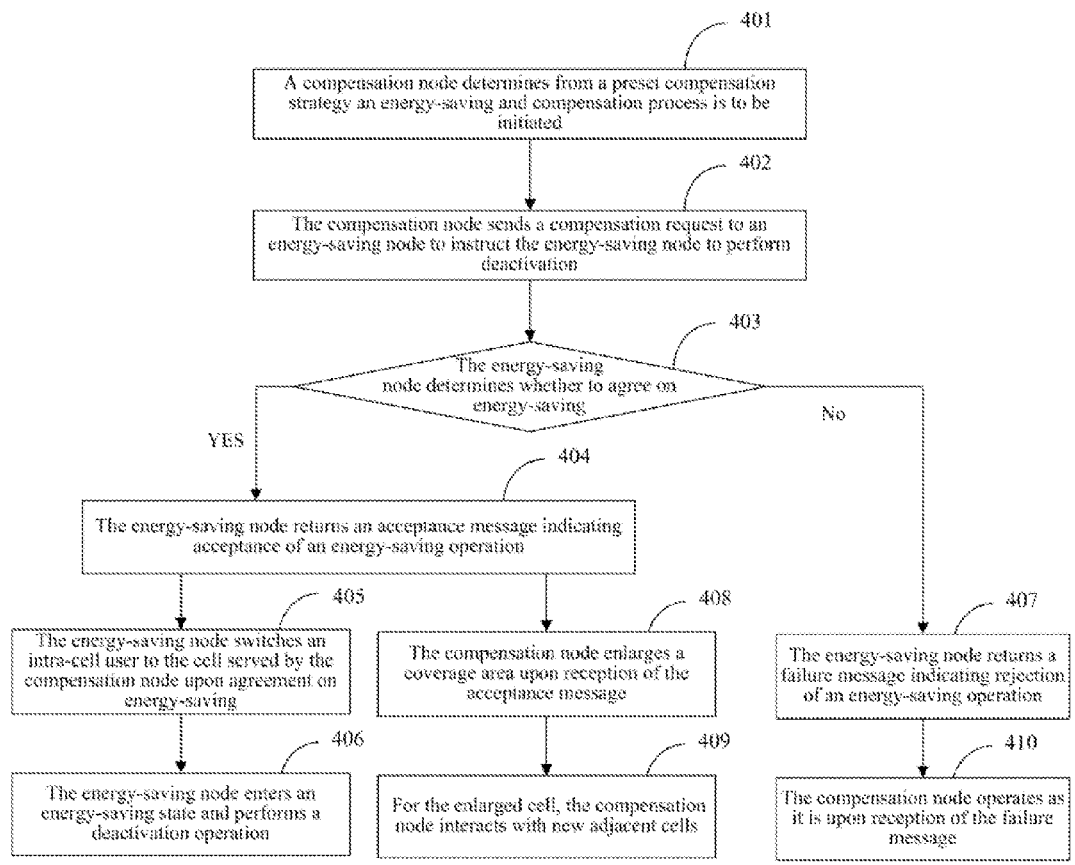
FIG. 4 is a flow chart of a method of a compensation node initiating energy-saving and compensation in a one-negotiation process in an embodiment of the invention.

Referring to FIG. 4, a flow of a method of a compensation node initiating energy-saving and compensation in a one-negotiation process in this embodiment is as follows:

Step 401: A compensation node determines from a preset compensation strategy an energy-saving and compensation process is to be initiated.

Step 402: The compensation node sends a compensation request to an energy-saving node to instruct the energy-saving node to perform deactivation. The compensation request can particularly be an energy-saving request or a cell compensation request. The energy-saving request or the cell compensation request carries the identifiers of target cells to be deactivated and can further include a minimum period of time after which a target cell is deactivated and enlarged coverage related information. A variety of enlarged coverage related information is possible, for example, a maximum coverage radius, maximum transmission power, current load information, remaining available load information, etc., of the compensation node. Particularly an energy-saving request in the prior art is applicable to an overlapping coverage scenario and only instructs a target cell to be deactivated, but a compensation node will not compensate. In this embodiment, the energy-saving request is applied to a single-layer coverage scenario and instructs a target cell to be deactivated, but also the compensation node compensates coverage of the target cell.

The compensation node can send a cell compensation request to all the adjacent energy-saving nodes concurrently, and then the cell compensation request carries the identifiers of cells served by all the adjacent energy-saving nodes. Alternatively the compensation node sends cell compensation requests separately to respective adjacent energy-saving nodes, and then the cell compensation request for each energy-saving node carries the identifiers of cells served by the energy-saving node.

Step 403. The energy-saving node determines whether to agree on energy-saving from a local energy-saving strategy and the received enlarged coverage related information, and if so, then the flow proceeds to the step 404; otherwise, the flow proceeds to the step 407. Particularly the energy-saving strategy can be preconfigured by an OAM entity or can be exchanged between cells.

Step 404: The energy-saving node returns an acceptance message indicating acceptance of an energy-saving operation. The acceptance message can particularly be a cell compensation response. The cell compensation response includes the identifier of a cell accepting energy-saving, that is, any cell without its corresponding cell identifier being carried will not accept an energy-saving operation, so a failure message as returned below may not carry a cell identifier.

Step 405: The energy-saving node switches an intra-cell user to the cell served by the compensation node upon agreement on energy-saving. If there is an accessing user served by the energy-saving node, then this step will be performed; otherwise, this step will be skipped.

Step 406: The energy-saving node enters an energy-saving state and performs a deactivation operation. Numerous deactivation operations are possible, e.g., to deactivate transmission. Preferably the energy-saving node reserves only a sounding function so as to receive an energy-saving state quit instruction.

Step 407: The energy-saving node returns a failure message indicating rejection of an energy-saving operation. The failure message can particularly be a cell compensation failure. The cell compensation failure may carry information indicating a reason for rejection of an energy-saving operation.

Step 408: The compensation node enlarges a coverage area upon reception of the acceptance message.

Step 409: For the enlarged cell, the compensation node interacts with new adjacent cells and collects RLF and other related information of the new adjacent cells so as to further adjust transmission power and optimize the coverage area.

Step 410: The compensation node operates as it is upon reception of the failure message.

In this embodiment, if there is an X2 interface between the compensation node and the energy-saving node, then the messages exchanged between the compensation node and the energy-saving node can be transmitted directly via the X2 interface, and at this time an example of the structure of the cell compensation request is as depicted in Table 3, an example of the structure of the cell compensation response is as depicted in Table 4, and an example of the structure of the cell compensation failure is as depicted in Table 5. If there is no X2 interface between the compensation node and the energy-saving node or there is an inter-RAT scenario between the compensation node and the energy-saving node, then the messages between the compensation node and the energy-saving node will be forwarded transparently by a device in a Core Network (CN), and at this time an example of the structure of the cell compensation request is as depicted in Table 6, an example of the structure of the cell compensation response is as depicted in Table 7, and an example of the structure of the cell compensation failure is as depicted in Table 8.

TABLE 3

| IE/Group Name | Value range | Description |
| --- | --- | --- |
| Message Type | | |
| Served Cells To Compensate | 1 to maxCellineNB | Indicate target cells requested to be deactivated |
| >ECGI | | Indicate the identifier of a cell |
| Served Coverage Area | | Indicate a service coverage area to be compensated |
| Load Information | | Indicate current load information or available capacity information |
| Time to wait | | Indicate a minimum period of time after which a target cell is allowed to be deactivated |

TABLE 4

| IE/Group Name | Value range | Description |
| --- | --- | --- |
| Message Type | | |
| Compensated Cell List | 1 to maxCellineNB | List of cells receiving an instruction and successfully responding with a compensation operation |
| >ECGI | | |
| Criticality Diagnostics | | |

TABLE 5

| IE/Group Name Message Type | Value range | Description |
| --- | --- | --- |
| Cause | | Reason for rejection |
| Criticality Diagnostics | | |

TABLE 6

| IE/Group Name | Presence | Range | IE type and reference | Semantics description |
| --- | --- | --- | --- | --- |
| CHOICE Energy-saving Application | M | | | |
| >Served Cells to Compensate | | | | |
| >>ECGI | M | | | |
| >Served Coverage Area | O | | | |
| >Load Information | O | | | |
| >Time to wait | O | | | |

TABLE 7

| IE/Group Name | Presence | Range | IE type and reference | Semantics description |
| --- | --- | --- | --- | --- |
| CHOICE Energy-saving Application | M | | | |
| >Served Cells To Compensate | | | | |
| >>ECGI | M | | | |

TABLE 8

| IE/Group Name | Presence | Range | IE type and reference | Semantics description |
|---|---|---|---|---|
| CHOICE Energy-saving Application | M | | | |
| >Cause | O | | | |

Figure 5:
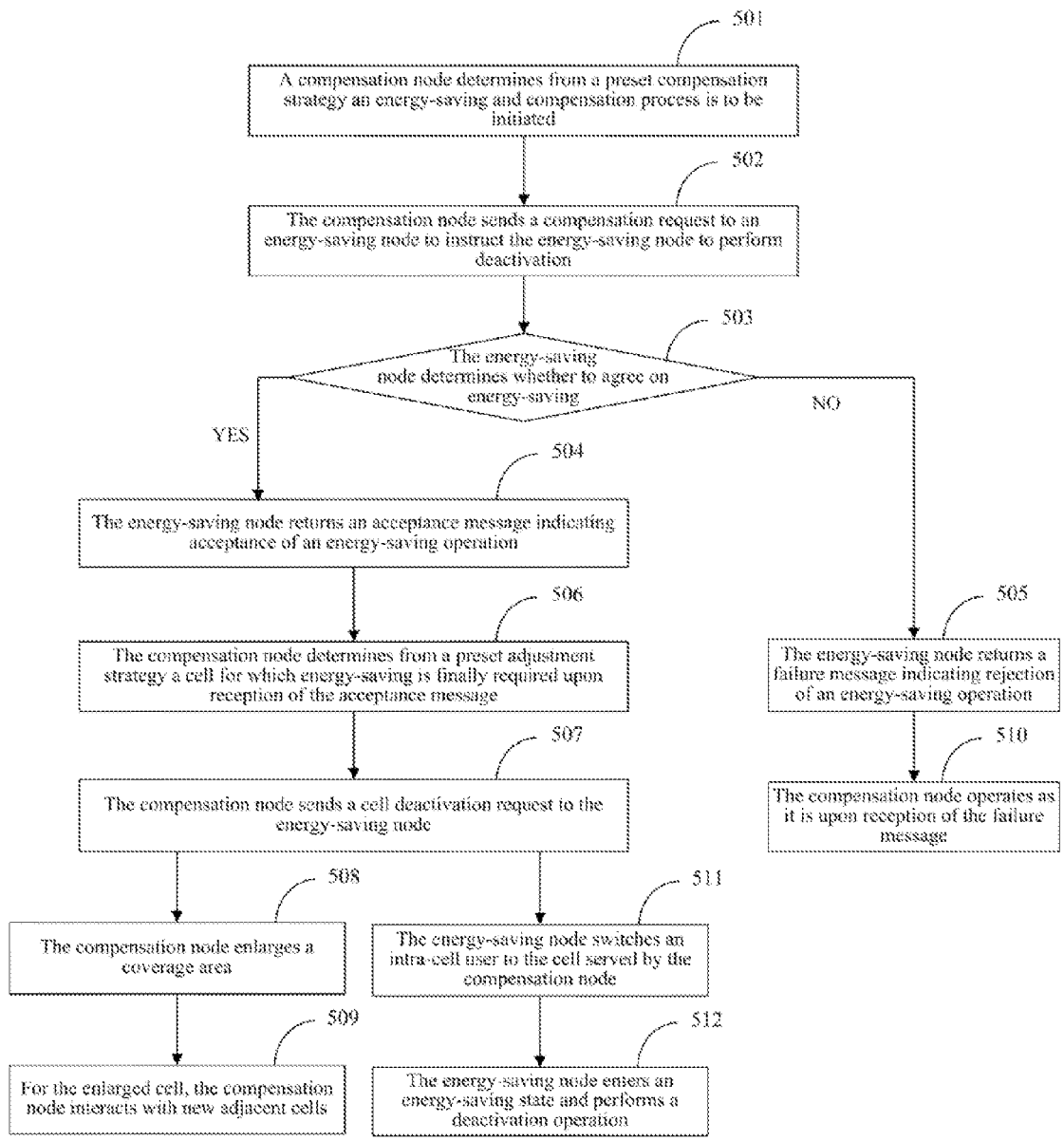
FIG. 5 is a flow chart of a method of a compensation node initiating energy-saving and compensation in a two-negotiation process in an embodiment of the invention.

Referring to FIG. 5, a flow of a method of a compensation node initiating energy-saving and compensation in a two-negotiation process in this embodiment is as follows:

Step 501: A compensation node determines from a preset compensation strategy an energy-saving and compensation process is to be initiated.

Step 502: The compensation node sends a compensation request to an energy-saving node to instruct the energy-saving node to perform deactivation. The compensation request can particularly be a cell compensation request.

Step 503. The energy-saving node determines whether to agree on energy-saving from a local energy-saving strategy and received enlarged coverage related information, and if so, then the flow proceeds to the step 504; otherwise, the flow proceeds to the step 505.

Step 504: The energy-saving node returns an acceptance message indicating acceptance of an energy-saving operation. The acceptance message can particularly be a cell compensation response. The cell compensation response includes the identifiers of cells accepting energy-saving, that is, any cell without its corresponding cell identifier being carried will not accept an energy-saving operation, so a failure message as returned below may not carry a cell identifier. The cell compensation response can further include the number of users and the amount of data to be switched, etc.

Step 505: The energy-saving node returns a failure message indicating rejection of an energy-saving operation. The failure message can particularly be a cell compensation failure. The cell compensation failure may carry information indicating a reason for rejection of an energy-saving operation.

Step 506: The compensation node determines from a preset adjustment strategy a cell for which energy-saving is finally required upon reception of the acceptance message. Numerous adjusting strategies are possible, for example, the number of users and the amount of data acceptable to switch together with cells where this part of users reside are determined from the size of a local available load capacity and the number of users and the amount of data received to be switched. Particularly the adjustment strategy can be configured by an OAM entity or can be exchanged between cells.

Step 507: The compensation node sends a cell deactivation request to the energy-saving node. The cell deactivation request carries the cell identifier of the cell for which energy-saving is finally required.

Step 508: The compensation node enlarges a coverage area.

Step 509: For the enlarged cell, the compensation node interacts with new adjacent cells and collects RLF and other related information of the new adjacent cells so as to further adjust transmission power and optimize the coverage area.

Step 510: The compensation node operates as it is upon reception of the failure message.

Step 511: The energy-saving node switches an intra-cell user to the cell served by the compensation node upon reception of the cell deactivation request. If there is an accessing user served by the energy-saving node, then this step will be performed; otherwise, this step will be skipped.

Step 512: The energy-saving node enters an energy-saving state and performs a deactivation operation. Numerous deactivation operations are possible, e.g., to deactivate transmission. Preferably the energy-saving node reserves only a sounding function so as to receive an energy-saving state quit instruction.

To perform an energy-saving and compensation operation, the operation can alternatively be initiated by the energy-saving node, and for a particular process, reference can be made to the following embodiments.

Figure 6:
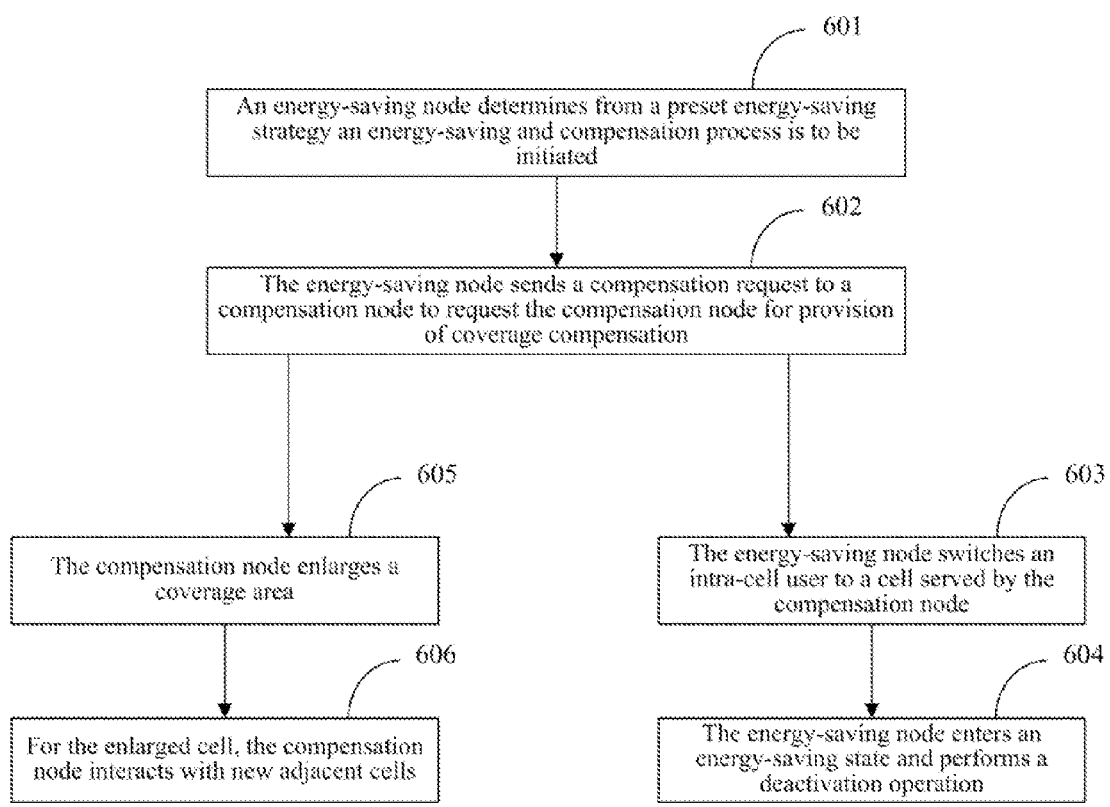
FIG. 6 is a flow chart of a method of an energy-saving node initiating energy-saving and compensation in a forced process in an embodiment of the invention.

Referring to FIG. 6, a flow of a method of an energy-saving node initiating energy-saving and compensation in a forced process in this embodiment is as follows:

Step 601: An energy-saving node determines from a preset energy-saving strategy an energy-saving and compensation process is to be initiated. Numerous preset energy-saving strategies are possible, for example, a preset point of time is reached, e.g., 11:00 p.m. Other energy-saving strategies are also possible and will not be enumerated here so as to avoid a repeated description, and any energy-saving strategy with an energy-saving and compensation process to be initiated can be applicable to this embodiment. Particularly the energy-saving strategy can be preconfigured by an OAM entity or can be exchanged between cells.

Step 602: The energy-saving node sends a compensation request to a compensation node to request the compensation node for provision of coverage compensation. The compensation request can particularly be a cell compensation indication. The cell compensation indication carries the identifiers of target cells to be deactivated and can further include a minimum period of time after which a target cell is deactivated. Particularly the energy-saving node can send the compensation request to the compensation node directly via an X2 interface; or can have the compensation request transparently transmitted to the compensation node over a core network.

Step 603: The energy-saving node switches an intra-cell user to a cell served by the compensation node. If there is an accessing user served by the energy-saving node, then this step will be performed; otherwise, this step will be skipped.

Step 604: The energy-saving node enters an energy-saving state and performs a deactivation operation. Numerous deactivation operations are possible, e.g., to deactivate transmission. Preferably the energy-saving node reserves only a sounding function so as to receive an energy-saving state quit instruction. And in order to reduce or avoid a coverage hole from occurring, the energy-saving node waits for a period of time after sending the compensation request and performs a deactivation operation when the length of the wait period of time reaches the minimum period of time after which a target cell is deactivated.

Step 605: The compensation node enlarges a coverage area upon reception of the compensation request. For example, a particular operation is to boost transmission power, to adjust an inclination angle of an antenna, etc.

Step 606: For the enlarged cell, the compensation node interacts with new adjacent cells and collects RLF and other related information of the new adjacent cells so as to further adjust transmission power and optimize the coverage area.

Figure 7:
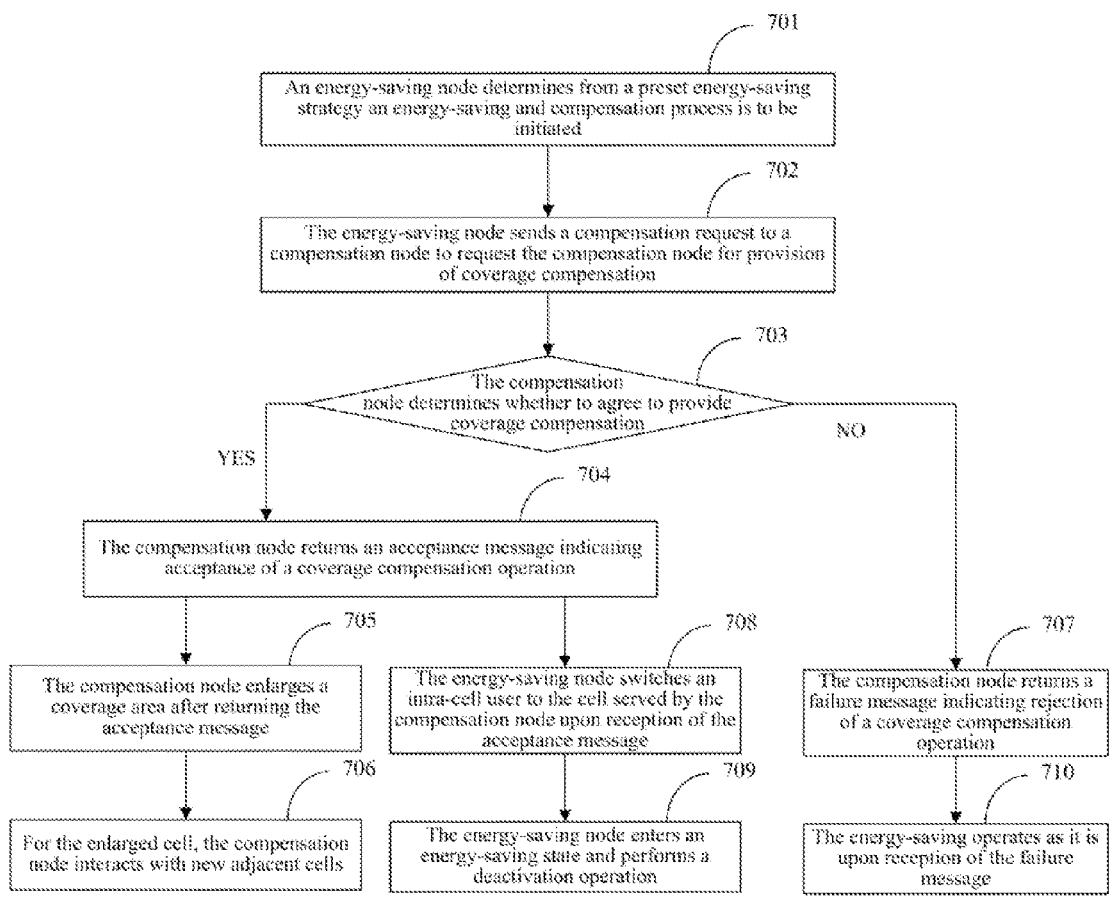
FIG. 7 is a flow chart of a method of an energy-saving node initiating energy-saving and compensation in a one-negotiation process in an embodiment of the invention.

Referring to FIG. 7, a flow of a method of an energy-saving node initiating energy-saving and compensation in a one-negotiation process in this embodiment is as follows:

Step 701: An energy-saving node determines from a preset energy-saving strategy an energy-saving and compensation process is to be initiated.

Step 702: The energy-saving node sends a compensation request to a compensation node to request the compensation node for provision of coverage compensation. The compensation request can particularly be a cell compensation request. The cell compensation indication carries the identifiers of target cells to be deactivated and can further include a minimum period of time after which a target cell is deactivated, load related information of the target cells, etc. A variety of load related information of the target cells is possible, e.g., the number of users and the amount of data per target cell, etc.

Step 703: The compensation node determines whether to agree to provide coverage compensation from a local compensation strategy and the received load related information of the target cells, and if so, then the flow proceeds to the step 704; otherwise, the flow proceeds to the step 709. Particularly the compensation strategy can be preconfigured by an OAM entity or can be exchanged between cells. Numerous compensation strategies are possible, for example, if a local available remaining capacity satisfies at least a demand of a part of the target cells for the amount of data, then the compensation node agrees to provide this part of the target cells with coverage compensation. Other compensation strategies are also possible and will not be enumerated here so as to avoid a repeated description thereof.

Step 704: The compensation node returns an acceptance message indicating acceptance of a coverage compensation operation. The acceptance message can particularly be a cell compensation response. The cell compensation response includes the identifier of a cell accepted to be compensated, that is, any cell without its corresponding cell identifier being carried will not be provided with a compensation operation, so a failure message as returned below may not carry a cell identifier.

Step 705: The compensation node enlarges a coverage area after returning the acceptance message.

Step 706: For the enlarged cell, the compensation node interacts with new adjacent cells and collects RLF and other related information of the new adjacent cells so as to further adjust transmission power and optimize the coverage area.

Step 707: The energy-saving node switches an intra-cell user to the cell served by the compensation node upon reception of the acceptance message. If there is an accessing user served by the energy-saving node, then this step will be performed; otherwise, this step will be skipped.

Step 708: The energy-saving node enters an energy-saving state and performs a deactivation operation. Numerous deactivation operations are possible, e.g., to deactivate transmission. Preferably the energy-saving node reserves only a sounding function on as to receive an energy-saving state quit instruction. And in order to reduce or avoid a coverage hole from occurring, the energy-saving node waits for a period of time after receiving the acceptance message and performs a deactivation operation when the length of the wait period of time reaches the minimum period of time after which a target cell is deactivated.

Step 709: The compensation node returns a failure message indicating rejection of a coverage compensation operation. The failure message can particularly be a cell compensation failure. The cell compensation failure may carry information indicating a reason for rejection of a coverage compensation operation.

Step 710: The energy-saving operates as it is upon reception of the failure message.

Referring to a flow of a method of an energy-saving node initiating energy-saving and compensation in a two-negotiation process in this embodiment is as follows:

Step 801: An energy-saving node determines from a preset energy-saving strategy an energy-saving and compensation process is to be initiated.

Step 802: The energy-saving node sends a compensation request to a compensation node to request the compensation node for provision of coverage compensation. The compensation request can particularly be a cell compensation request.

Step 803. The compensation node determines whether to agree to provide coverage compensation from a local compensation strategy and received load related information of target cells, and if so, then the flow proceeds to the step 804; otherwise, the flow proceeds to the step 805.

Step 804: The compensation mode returns an acceptance message indicating acceptance of a coverage compensation operation. The acceptance message can particularly be a cell compensation response. The cell compensation response includes the identifiers of cells accepted to be compensated, that is, any cell without its corresponding cell identifier being carried will not be provided with a compensation operation, so a failure message as returned below may not carry a cell identifier. The cell compensation response can further include enlarged coverage related information, etc.

Step 805: The compensation node returns a failure message indicating rejection of a coverage compensation operation. The failure message can particularly be a cell compensation failure. The cell compensation failure may carry information indicating a reason thr rejection of a coverage compensation operation.

Step 806: The energy-saving node determines a cell for which energy-saving is finally required from a preset adjustment strategy upon reception of the acceptance message. Numerous adjusting strategies are possible, for example, the number of users and the amount of data acceptable to switch together with cells where this part of users reside are determined from the size of a received available load capacity and the number of local users and the amount of data to be switched. Particularly the adjustment strategy can be configured by an OAM entity or can be exchanged between cells.

Step 807: The energy-saving node sends a cell deactivation request to the compensation node. The cell deactivation request carries the cell identifier of the cell for which energy-saving is finally required.

Step 808: The energy-saving node switches an intra-cell user to the cell served by the compensation node after sending the cell deactivation request. If there is an accessing user served by the energy-saving node, then this step will be performed; otherwise, this step will be skipped.

Step 809: The energy-saving node enters an energy-saving state and performs a deactivation operation, particularly to deactivate the cell for which energy-saving is finally required. Numerous deactivation operations are possible, e.g., to deactivate transmission. Preferably the energy-saving node reserves only a sounding function so as to receive an energy-saving state quit instruction. And the energy-saving node waits for a period of time after sending the cell deactivation request and performs a deactivation operation when the length of the wait period of time reaches the minimum period of time after which a target cell is deactivated.

Step 810: The compensation node sends a compensation request to another non-requesting energy-saving node upon reception of the cell deactivation request to instruct the other energy-saving node to deactivate a cell. The compensation request can be a cell compensation indication or a cell compensation request. For operations of the other energy-saving node upon reception of the compensation request, reference can be made to the flows illustrated in FIG. 3 to FIG. 5, i.e., the flow charts of the compensation processes initiated by the compensation node. In this step, primarily in view of that the compensation node may have omni-directional coverage, when some cell or cells are provided with coverage compensation, its enlarged coverage area may cover a non-requesting cell or cells and an energy-saving operation can also be performed on this part of cells to save energy. Of course the second negotiation in this embodiment includes negotiation between the compensation node and the other energy-saving node.

Step 811: The compensation node enlarges a coverage area.

Step 812: For the enlarged cell, the compensation node interacts with new adjacent cells and collects RLF and other related information of the new adjacent cells so as to further adjust transmission power and optimize the coverage area.

Step 813: The energy-saving node operates as it is upon reception of the failure message.

To perform an energy-saving and compensation operation, a device initiating the energy-saving and compensation operation will not be limited to a compensation node and an energy-saving node, but the operation can also be initiated by a third-party device, e.g., an OAM entity, and for a particular process, reference can be made to the following embodiments.

Figure 9:
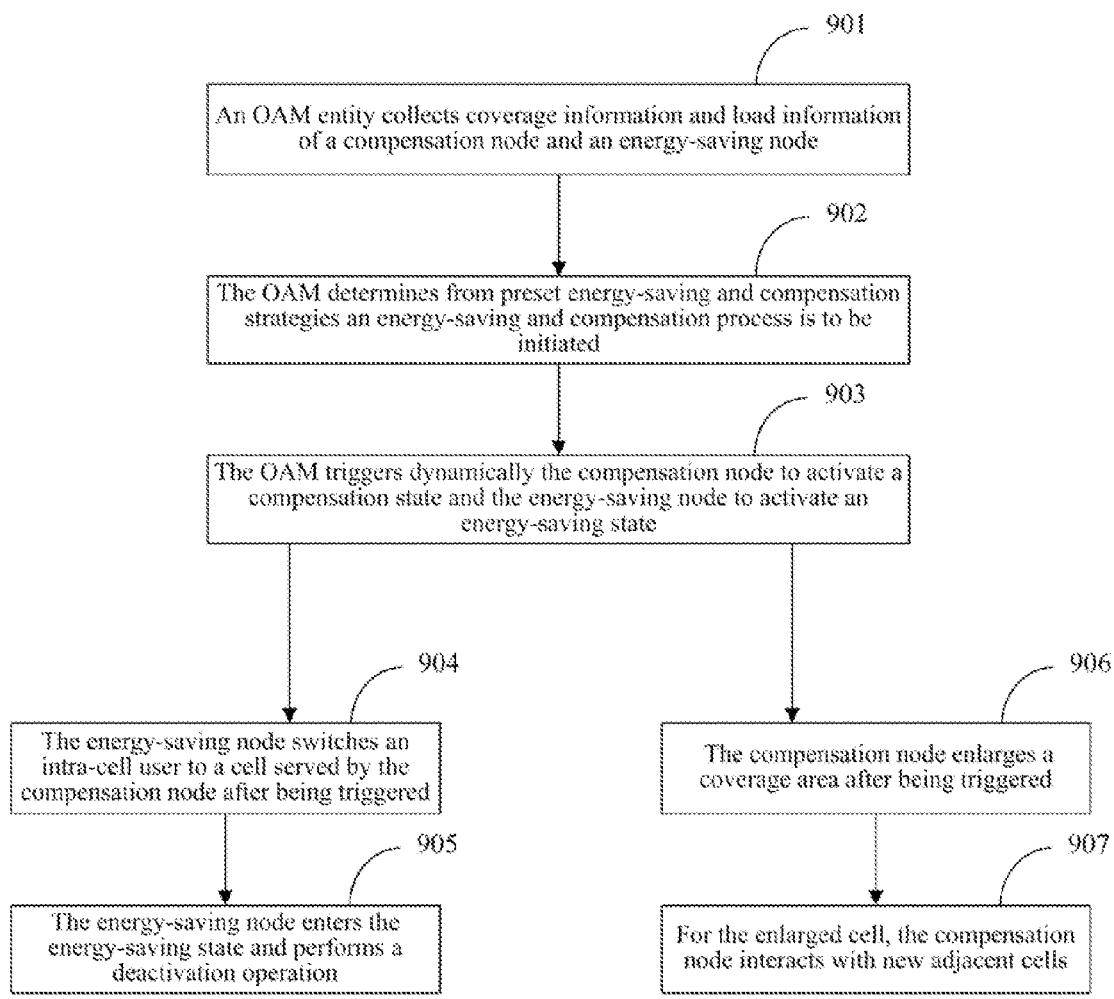
FIG. 9 is a flow chart of a method of an Operation, Administration and Maintenance (OAM) entity initiating energy-saving and compensation in a forced process in an embodiment of the invention.

Referring to FIG. 9, a method of an OAM entity initiating energy-saving and compensation in a forced process in this embodiment is as follows:

Step 901: An OAM entity collects coverage information, load information, etc., of a compensation node and an energy-saving node. This is only exemplary and the OAM entity can collect any energy-saving and compensation related information. This step can be performed periodically or at fixed timings or under some trigger condition.

Figure 8:
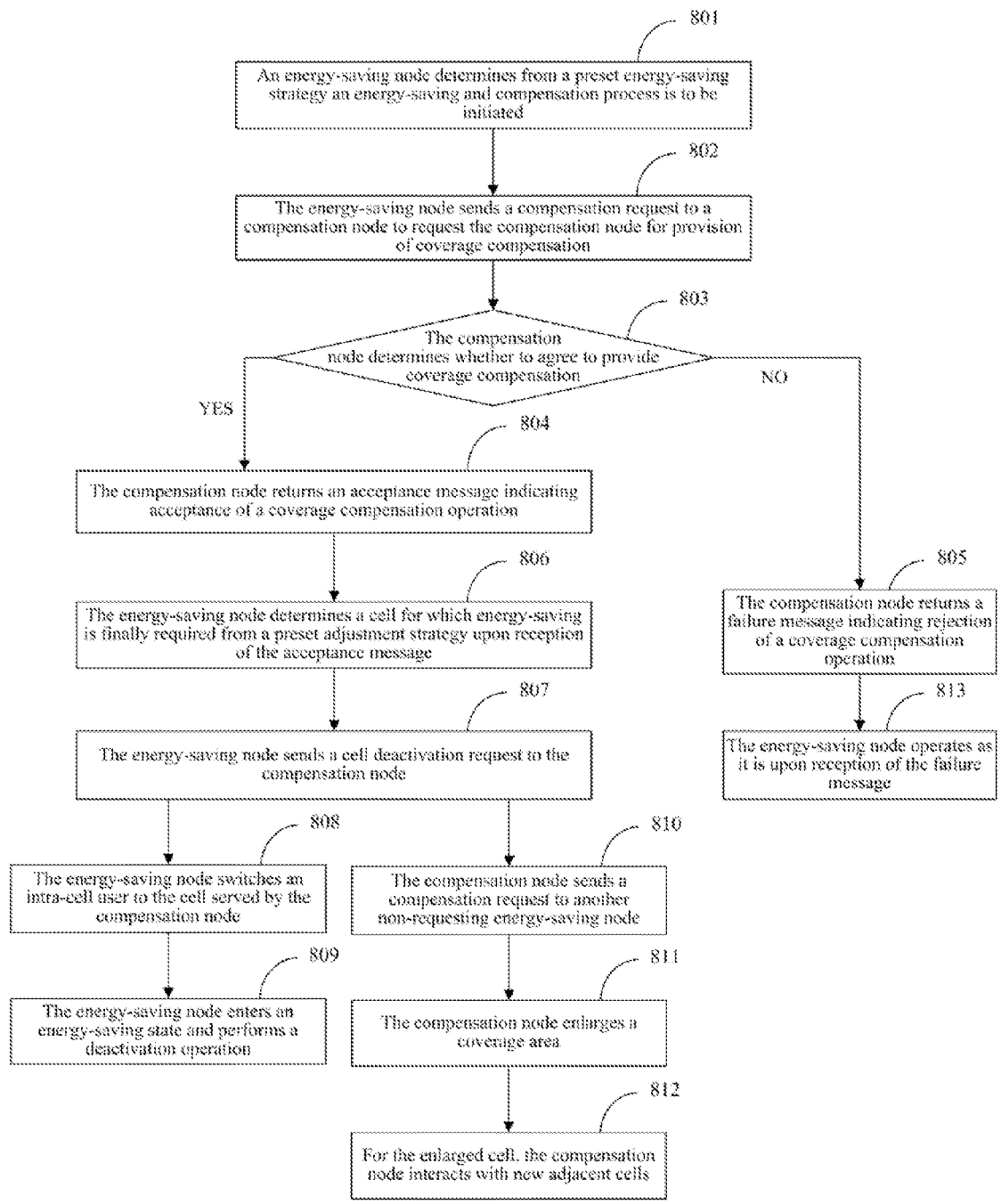
FIG. 8 is a flow chart of a method of an energy-saving node initiating energy-saving and compensation in a two-negotiation process in an embodiment of the invention.

Step 902: The OAM determines from preset energy-saving and compensation strategies an energy-saving and compensation process is to be initiated. The preset energy-saving and compensation strategies can include the compensation strategy of the compensation node in FIG. 3 to FIG. 5 and/or the energy-saving strategy of the energy-saving node in FIG. 6 to FIG. 8.

Step 903: The OAM triggers dynamically the compensation node to activate a compensation state and the energy-saving node to activate an energy-saving state. The OAM can trigger the compensation state and the energy-saving state particularly by sending a compensation request to the compensation node and the energy-saving node. The compensation request can particularly be a cell compensation indication or another configuration message.

Step 904: The energy-saving node switches an intra-cell user to a cell served by the compensation node after being triggered. If there is an accessing user served by the energy-saving node, then this step will be performed; otherwise, this step will be skipped.

Step 905: The energy-saving node enters the energy-saving state and performs a deactivation operation. Numerous deactivation operations are possible, e.g., to deactivate transmission. Preferably the energy-saving node reserves only a sounding function so as to receive an energy-saving state quit instruction. And in order to reduce or avoid a coverage hole from occurring, the energy-saving node waits for a period of time after being triggered and performs a deactivation operation when the length of the wait period of time reaches a preset minimum period of time after which a target cell is deactivated.

Step 906: The compensation node enlarges a coverage area after being triggered. For example, a particular operation is to boost transmission power, to adjust an inclination angle of an antenna, etc.

Step 907: For the enlarged cell, the compensation node interacts with new adjacent cells and collects RLF and other related information of the new adjacent cells so as to further adjust transmission power and optimize the coverage area.

Particularly the steps 904 and 905 can be performed in synchronization with the steps 906 and 907.

Figure 10:
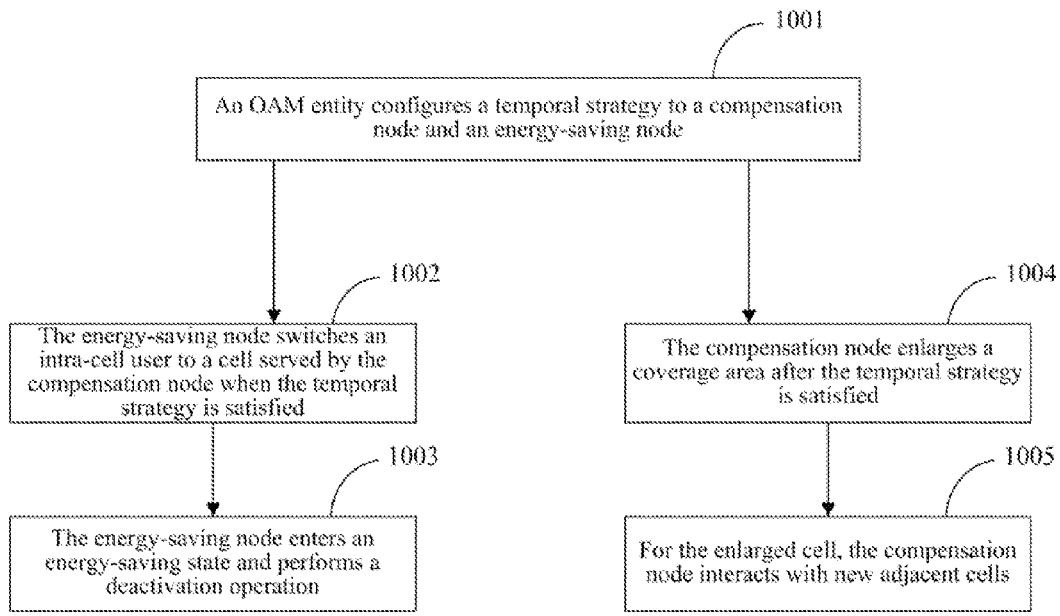
FIG. 10 is a flow chart of a method of initiating an energy-saving and compensation process automatically after an OAM entity pre-configures energy-saving and compensation strategies in an embodiment of the invention.

Referring to FIG. 10, a flow of a method of initiating an energy-saving and compensation process automatically after an OAM entity pre-configures energy-saving and compensation strategies is as follows:

Step 1001: An OAM entity configures a temporal strategy to a compensation node and an energy-saving node. The temporal strategy can be timings or can be periodical. For example, in a timing temporal strategy, the compensation node quits/enters a compensation state again three hours after entering/quitting the compensation state, and also the related energy-saving node is activated/deactivated three hours after being deactivated/activated. For example, in a periodical temporal strategy; the compensation node enters/quits a compensation state for a period of time of 0:00 to 7:00, and also a period of time for which the related energy-saving node enters/quits an energy-saving state can be set the same as 0:00 to 7:00. In this embodiment, the temporal strategy can be regarded as an energy-saving or compensation strategy or a part thereof.

After the temporal strategy is configured once, the following steps can be performed repeatedly.

Step 1002: The energy-saving node switches an intra-cell user to a cell served by the compensation node when the temporal strategy is satisfied. If there is an accessing user served by the energy-saving node, then this step will be performed; otherwise, this step will be skipped.

Step 1003: The energy-saving node enters an energy-saving state and performs a deactivation operation. Numerous deactivation operations are possible, e.g., to deactivate transmission. Preferably the energy-saving node reserves only a sounding function so as to receive an energy-saving state quit instruction. And in order to reduce or avoid a coverage hole from occurring, the energy-saving node waits for a period of time after the temporal strategy is satisfied and performs a deactivation operation when the length of the wait period of time reaches a preset minimum period of time after which a target cell is deactivated.

Step 1004: The compensation node enlarges a coverage area after the temporal strategy is satisfied. For example, a particular operation is to boost transmission power, to adjust an inclination angle of an antenna, etc.

Step 1005: For the enlarged cell, the compensation node interacts with new adjacent cells and collects RLF and other related information of the new adjacent cells so as to further adjust transmission power and optimize the coverage area.

The foregoing embodiment performs energy-saving and compensation of the cell or the node to thereby save energy and reduce radiation. However the compensation node may fail to satisfy a demand when there is an increase in the number of users or the amount of data, and at this time the energy-saving node will be activated so as to provide a better communication service. A coverage restoration process will be introduced below.

Figure 11:
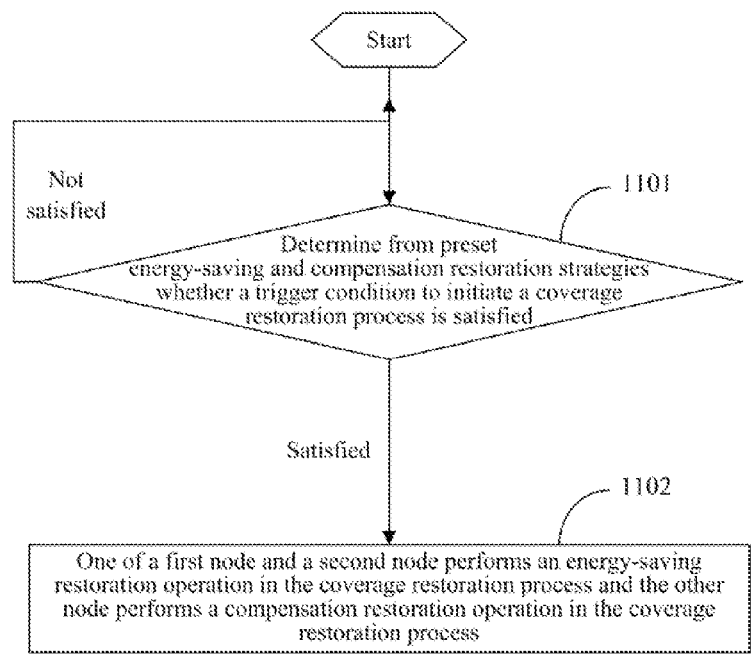
FIG. 11 is a general flow chart of a coverage area restoration method in an embodiment of the invention.

Referring to FIG. 11, a general flow of a coverage area restoration method in this embodiment is as follows:

Step 1101: It is determined from preset energy-saving and compensation restoration strategies whether a trigger condition to initiate a coverage restoration process is satisfied.

Step 1102: If the trigger condition to initiate the coverage restoration process is satisfied, one of a first node and a second node performs an energy-saving restoration operation in the coverage restoration process and the other node performs a compensation restoration operation in the coverage restoration process; otherwise, the step 1101 is repeated.

Particularly the first node is a compensation node, and the second node is an energy-saving node; or the first node is an energy-saving node, and the second node is a compensation node. Similarly to the coverage area compensation process, the step 1101 can be performed by the compensation node or the energy-saving node or can be performed by a third-party OAM entity. And the compensation node and the energy-saving node can trigger and negotiate about the coverage restoration operations in numerous ways. In this embodiment, the compensation node enforces the compensation restoration strategy among the energy-saving and compensation restoration strategies, and the energy-saving node enforces the energy-saving restoration strategy among the energy-saving and compensation restoration strategies. An implementation process will be introduced below in details in several embodiments.

Referring to a flow of a method of a compensation node initiating coverage restoration in a forced process in this embodiment is as follows:

Step 1201: A compensation node determines from a preset compensation restoration strategy a coverage restoration process is to be initiated. Numerous preset compensation restoration strategies are possible, for example, a preset point of time is reached, e.g., 7 a.m. Other compensation restoration strategies are also possible and will not be enumerated here so as to avoid a repeated description thereof, and any compensation restoration strategy with a coverage restoration process to be initiated can be applicable to this embodiment. Particularly the compensation restoration strategy can be preconfigured by an OAM entity or can be exchanged between cells.

Step 1202: The compensation node sends a de-compensation request to an energy-saving node to instruct the energy-saving node to perform activation. The de-compensation request can particularly be a cell de-compensation indication. The cell de-compensation indication carries the identifiers of target cells requested to be activated and can further include a maximum period of tune within which a target cell is activated, that is, the target cell will be activated within this period of time rather than alter this period of time so that when the compensation node narrows a coverage area, the energy-saving node covers the target cell so as to reduce or avoid a coverage hole from occurring. The compensation node can send a cell de-compensation indication to all the adjacent energy-saving nodes concurrently, and then the cell de-compensation indication carries the identifiers of cells served by all the adjacent energy-saving nodes. Alternatively the compensation node sends cell de-compensation indications separately to respective adjacent energy-saving nodes, and then the cell compensation indication for each energy-saving node carries the identifiers of cells served by the energy-saving node.

Step 1203: The compensation node switches a user to an activated energy-saving cell. If there is a user, served by the compensation node, to be switched, then this step will be performed; otherwise, this step 11 be skipped. For whether to switch a user, reference can be made to the specification regarding a handover decision in the communication protocol.

Step 1204: The compensation node quits a compensation state and narrows a coverage area. For example, a particular operation is to lower transmission power, to adjust an inclination angle of an antenna, etc. The compensation node can switch the user progressively and narrow the coverage area progressively.

Step 1205: For the narrowed cell, the compensation node interacts with new adjacent cells and collects RLF and other related information of the new adjacent cells so as to further adjust transmission power and optimize the coverage area.

Step 1206: The energy-saving node performs an activation operation and activates all the functions of the cell, served by the node, to be activated upon reception of the de-compensation request.

Step 1207: The energy-saving node admits the switched-in user.

In this embodiment, if there is an X2 interface between the compensation node and the energy-saving node, then the compensation node can send the cell de-compensation indication to the energy-saving node via the X2 interface, and an example of the structure of the cell de-compensation indication is as depicted in Table 9. If there is no X2 interface between the compensation node and the energy-saving node or there is an inter-RAT scenario between the compensation node and the energy-saving node, then the cell de-compensation indication will be forwarded by a device in a Core Network (CN) to the energy-saving node, and at this time an example of the structure of the cell de-compensation indication is as depicted in Table 10, and simply the device in the core network can transparently transmit the cell de-compensation indication directly.

TABLE 9

| IE/Group Name | Value range | Description |
|---|---|---|
| Message Type | | |
| Served Cells To Decompensate | 1 to maxCellineNB, i.e., the maximum identifier of cells served by a NodeB | Indicate target cells requested to be activated |
| >Evolved Cell Global Identifier (ECGI) | | Indicate the identifier of a cell |
| Time to wait | | Indicate a maximum period of time within which a target cell is allowed to be activated |

TABLE 10

| IE/Group Name | Presence | Range | IE type and reference | Semantics description |
|---|---|---|---|---|
| CHOICE Energy-saving Application | Must (M) | | | |
| >Served Cells To Decompensate | | | | Indicate target cells requested to be activated |
| >>ECGI | M | | | |
| >Time to wait | Optional (O) | | | |

Figure 13:
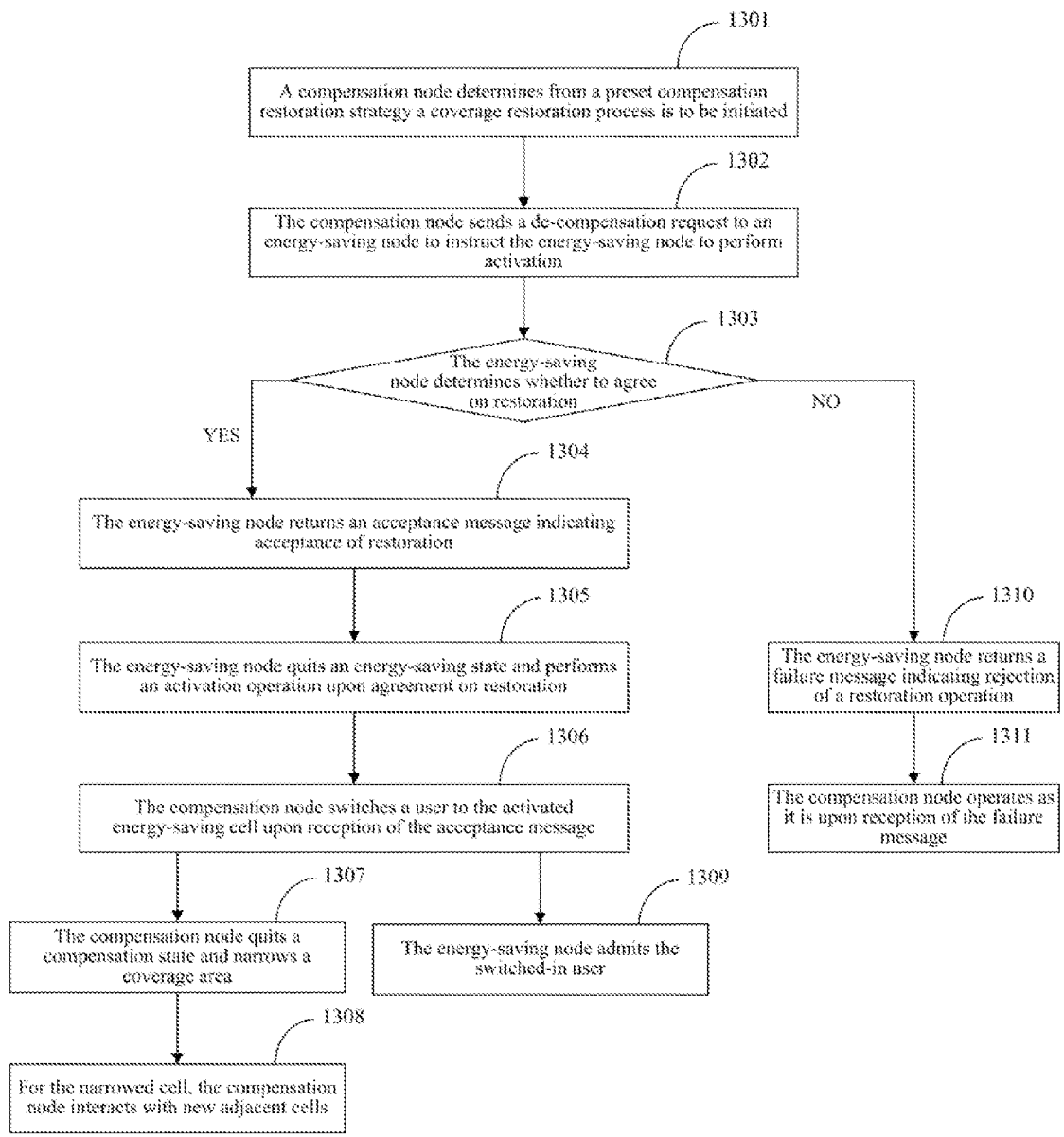
FIG. 13 is a flow chart of a method of a compensation node initiating coverage restoration in a one-negotiation process in an embodiment of the invention.

Referring to FIG. 13, a flow of a method of a compensation node initiating coverage restoration in a one-negotiation process in this embodiment is as follows:

Step 1301: A compensation node determines from a preset compensation restoration strategy a coverage restoration process is to be initiated.

Step 1302: The compensation node sends a de-compensation request to an energy-saving node to instruct the energy-saving node to perform activation. The de-compensation request can particularly be a cell de-compensation request. The cell de-compensation request carries the identifiers of target cells requested to be activated and can further include a maximum period of time within which a target cell is activated and narrowed coverage related information. A variety of narrowed coverage related information is possible, for example, a narrowed coverage radius, lowered transmission power, current load information, to-be-transferred load information, etc., of the compensation node.

The compensation node can send a cell de-compensation request to all the adjacent energy-saving nodes concurrently, and then the cell compensation request carries the identifiers of cells served by all the adjacent energy-saving nodes. Alternatively the compensation node sends cell de-compensation requests separately to respective adjacent energy-saving nodes, and then the cell de-compensation request for each energy-saving node carries the identifiers of cells served by the energy-saving node.

Step 1303. The energy-saving node determines whether to agree on restoration from a local de-energy-saving strategy and the received narrowed coverage related information, and if so, then the flow proceeds to the step 1304; otherwise, the flow proceeds to the step 1310. Particularly the de-energy-saving strategy can be preconfigured by an OAM entity or can be exchanged between cells. Numerous de-energy-saving strategies are possible, for example, the energy-saving node agrees on restoration upon reception of a cell de-compensation request, agrees on restoration when a preconfigured point of time is satisfied, etc.

Step 1304: The energy-saving node returns an acceptance message indicating acceptance of restoration. The acceptance message can particularly be a cell de-compensation response. The cell de-compensation response includes the identifier of a cell accepting activation, that is, any cell without its corresponding cell identifier being carried will not accept a restoration operation, so a failure message as returned below may not carry a cell identifier.

Step 1305: The energy-saving node quits an energy-saving state, performs an activation operation and restores a service of the cell accepting activation upon agreement on restoration.

Step 1306: The compensation node switches a user to the activated energy-saving cell upon reception of the acceptance message. If there is a user, served by the compensation node, to be switched, then this step will be performed; otherwise, this step will be skipped. For whether to switch a user, reference can be made to the specification regarding a handover decision in the communication protocol.

Step 1307: The compensation node quits a compensation state and narrows a coverage area. For example, a particular operation is to lower transmission power, to adjust an inclination angle of an antenna, etc.

Step 1308: For the narrowed cell, the compensation node interacts with new adjacent cells and collects RLF and other related information of the new adjacent cells so as to further adjust transmission power and optimize the coverage area.

Step 1309: The energy-saving node admits the switched-in user.

Step 1310: The energy-saving node returns a failure message indicating rejection of a restoration operation. The failure message can particularly be a cell de-compensation failure. The cell de-compensation failure may carry information indicating a reason for rejection of a restoration operation.

Step 1311: The compensation node operates as it is upon reception of the failure message.

In this embodiment, if there is an X2 interface between the compensation node and the energy-saving node, then the messages exchanged between the compensation node and the energy-saving node can be transmitted directly via the X2 interface, and at this time an example of the structure of the cell de-compensation request is as depicted in Table 11, an example of the structure of the cell de-compensation response is as depicted in Table 12, and an example of the structure of the cell de-compensation failure is as depicted in Table 13. If there is no X2 interface between the compensation node and the energy-saving node or there is an inter-RAT scenario between the compensation node and the energy-saving node, then the messages between the compensation node and the energy-saving node will be forwarded transparently by a device in a Core Network (CN), and at this time an example of the structure of the cell de-compensation request is as depicted in Table 14, an example of the structure of the cell de-compensation response is as depicted in Table 15, and an example of the structure of the cell de-compensation failure is as depicted in Table 16.

TABLE 11

| IE/Group Name | Value range | Description |
|---|---|---|
| Message Type | | |
| Served Cells To Decompensate | 1 to maxCellineNB | Indicate target cells requested to be activated |
| >ECGI | | Indicate the identifier of a cell |
| Served Coverage Area | | Indicate a service coverage area to be compensated |
| Load Information | | Indicate current load information or to-be-transferred load information |
| Time to wait | | Indicate a maximum period of time within which a target cell is allowed to be activated |

TABLE 12

| IE/Group Name | Value range | Description |
|---|---|---|
| Message Type | | |
| Decompensated Cell List | 1 to maxCellineNB | List of cells receiving an instruction and successfully responding with a de-compensation operation |
| >ECGI Criticality Diagnostics) | | |

TABLE 13

| IE/Group Name Message Type | Value range | Description |
|---|---|---|
| Cause Criticality Diagnostics | | Reason for rejection |

TABLE 14

| IE/Group Name | Presence | Range | IE type and reference | Semantics description |
|---|---|---|---|---|
| CHOICE Energy saving Application | M | | | |
| >Served Cells To Decompensate | | | | Indicate target cells requested to be activated |
| >>ECGI | M | | | |
| >Served Coverage Area | O | | | Indicate a service coverage area to be compensated |

TABLE 14-continued

| IE/Group Name | Presence | Range | IE type and reference | Semantics description |
|---|---|---|---|---|
| >Load Information | O | | | Indicate current load information or to-be-transferred load information |
| >Time to wait | O | | | Indicate a maximum period of time within which a target cell is allowed to be activated |

TABLE 15

| IE/Group Name | Presence | Range | IE type and reference | Semantics description |
|---|---|---|---|---|
| CHOICE Energy saving Application | M | | | |
| >Served Cells To Decompensate | | | | Indicate target cells accepting activation |
| >>ECGI | M | | | |

TABLE 16

| IE/Group Name | Presence | Range | IE type and reference | Semantics description |
|---|---|---|---|---|
| CHOICE Energy saving Application | M | | | |
| >Cause | O | | | |

Figure 14:
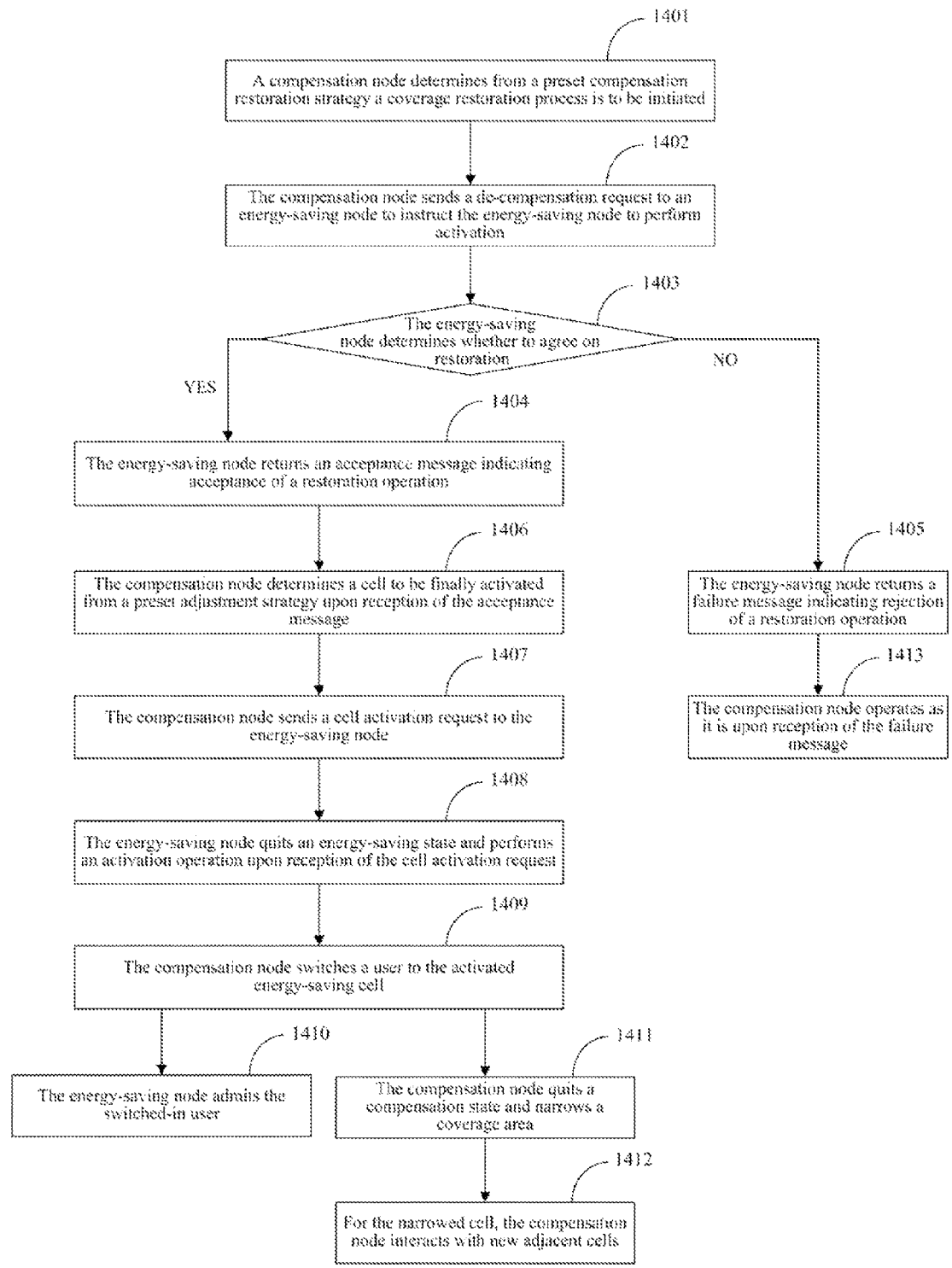
FIG. 14 is a flow chart of a method of a compensation node initiating coverage restoration in a two-negotiation process in an embodiment of the invention.

Referring to FIG. 14, a flow of a method of a compensation node initiating coverage restoration in a two-negotiation process in this embodiment is as follows:

Step 1401: A compensation node determines from a preset compensation restoration strategy a coverage restoration process is to be initiated.

Step 1402: The compensation node sends a de-compensation request to an energy-saving node to instruct the energy-saving node to perform activation. The de-compensation request can particularly be a cell de-compensation request.

Step 1403. The energy-saving node determines whether to agree on restoration from a local de-energy-saving strategy and received narrowed coverage related information, and if so, then the flow proceeds to the step 1404; otherwise, the flow proceeds to the step 1405.

Step 1404: The energy-saving node returns an acceptance message indicating acceptance of a restoration operation. The acceptance message can particularly be a cell de-compensation response. The cell de-compensation response includes the identifiers of cells accepting activation, that is, any cell without its corresponding cell identifier being carried will not accept a restoration operation, so a failure message as returned below may not carry a cell identifier. The cell de-compensation response can further include cell types, cell sizes and other information.

Step 1405: The energy-saving node returns a failure message indicating rejection of a restoration operation. The failure message can particularly be a cell de-compensation failure. The cell de-compensation failure may carry information indicating a reason for rejection of a restoration operation.

Step 1406: The compensation node determines a cell to be finally activated from a preset adjustment strategy upon reception of the acceptance message. Numerous adjusting strategies are possible, for example, the number of users and the amount of data acceptable to switch together with cells where this part of users reside are determined from the number of local users, the amount of local data and the received cell types, sizes and other information. Particularly the adjustment strategy can be configured by an OAM entity or can be exchanged between cells.

Step 1407: The compensation node sends a cell activation request to the energy-saving node. The cell activation request carries the cell identifier of the cell to be finally activated.

Step 1408: The energy-saving node quits an energy-saving state, performs an activation operation and restores a service of the cell accepting activation upon reception of the cell activation request.

Step 1409: The compensation node switches a user to the activated energy-saving cell. If there is a user, served by the compensation node, to be switched, then this step will be performed; otherwise, this step will be skipped. For whether to switch a user, reference can be made to the specification regarding a handover decision in the communication protocol.

Step 1410: The energy-saving node admits the switched-in user.

Step 1411: The compensation node quits a compensation state and narrows a coverage area. For example, a particular operation is to lower transmission power, to adjust an inclination angle of an antenna, etc.

Step 1412: For the narrowed cell, the compensation node interacts with new adjacent cells and collects RLF and other related information of the new adjacent cells on as to further adjust transmission power and optimize the coverage area.

Step 1413: The compensation node operates as it is upon reception of the failure message.

To perform a coverage restoration operation, the operation can alternatively be initiated by the energy-saving node, and for a particular process, reference can be made to the following embodiments.

Figure 15:
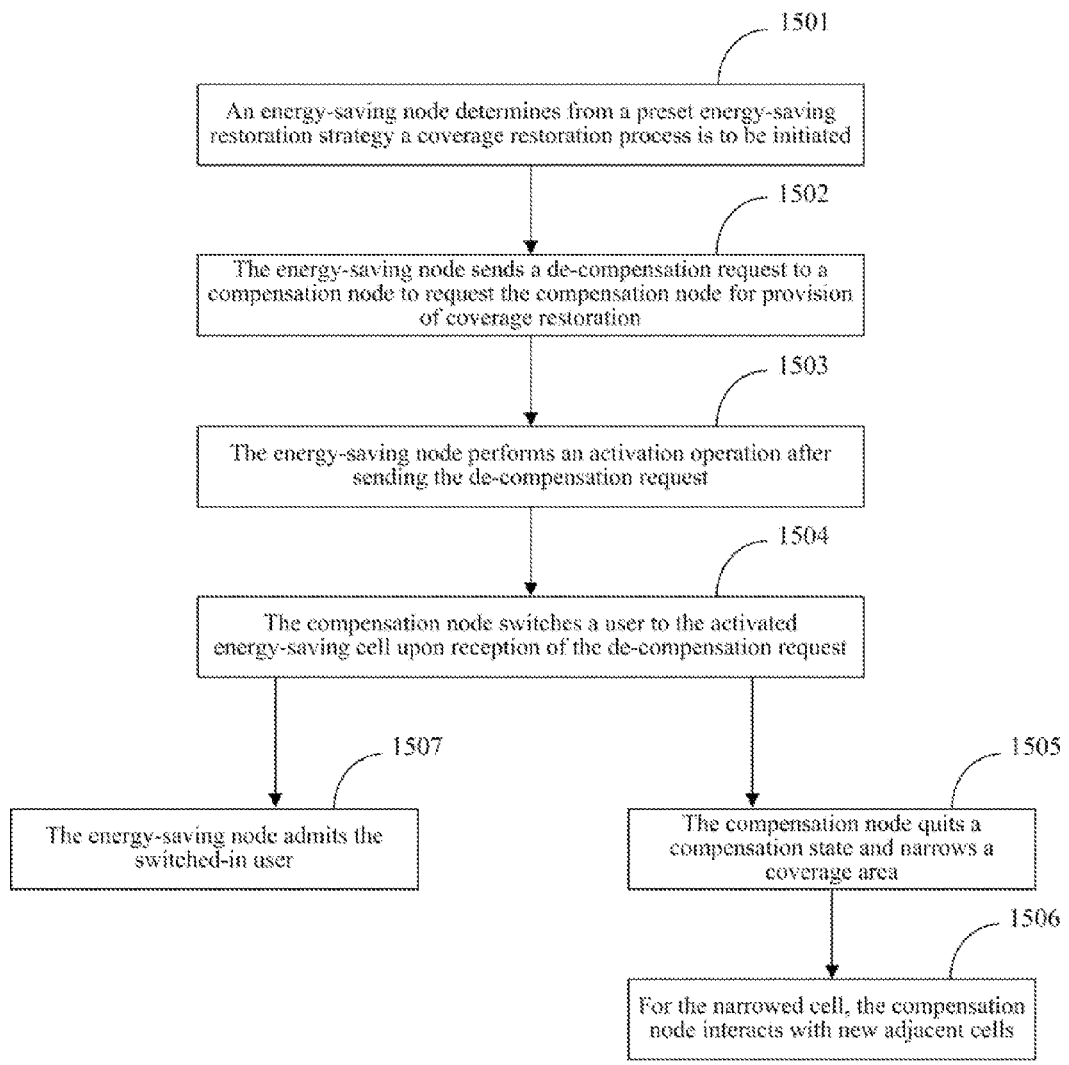
FIG. 15 is a flow chart of a method of an energy-saving node initiating coverage restoration in a forced process in an embodiment of the invention.

Referring to FIG. 15, a flow of a method of an energy-saving node initiating coverage restoration in a forced process in this embodiment as follows:

Step 1501: An energy-saving node determines from a preset energy-saving restoration strategy a coverage restoration process is to be initiated. Numerous preset energy-saving restoration strategies are possible, for example, a preset point of time is reached, e.g., 7 a.m. Other energy-saving restoration strategies are also possible and will not be enumerated here so as to avoid a repeated description, and any energy-saving restoration strategy with a coverage restoration process to be initiated can be applicable to this embodiment. Particularly the energy-saving restoration strategy can be preconfigured by an OAM entity or can be exchanged between cells.

Step 1502: The energy-saving node sends a de-compensation request to a compensation node to request the compensation node for provision of coverage restoration. The de-compensation request can particularly be a cell de-compensation indication. The cell de-compensation indication carries the identifiers of target cells requested to be activated and can further include a maximum period of time within which a target cell is activated. Particularly the energy-saving node can send the de-compensation request to the compensation node directly via an X2 interface; or can have the de-compensation request transparently transmitted to the compensation node over a core network.

Step 1503: The energy-saving node performs an activation operation and activates all the functions of a cell, served by the node, to be activated after sending the de-compensation request.

Step 1504: The compensation node switches a user to the activated energy-saving cell upon reception of the de-compensation request. If there is a user, served by the compensation node, to be switched, then this step will be performed; otherwise, this step will be skipped. For whether to switch a user, reference can be made to the specification regarding a handover decision in the communication protocol.

Step 1505: The compensation node quits a compensation state and narrows a coverage area. For example, a particular operation is to lower transmission power, to adjust an inclination angle of an antenna, etc.

Step 1506: For the narrowed cell, the compensation node interacts with new adjacent cells and collects RLF and other related information of the new adjacent cells so as to further adjust transmission power and optimize the coverage area.

Step 1507: The energy-saving node admits the switched-in user.

Figure 16:
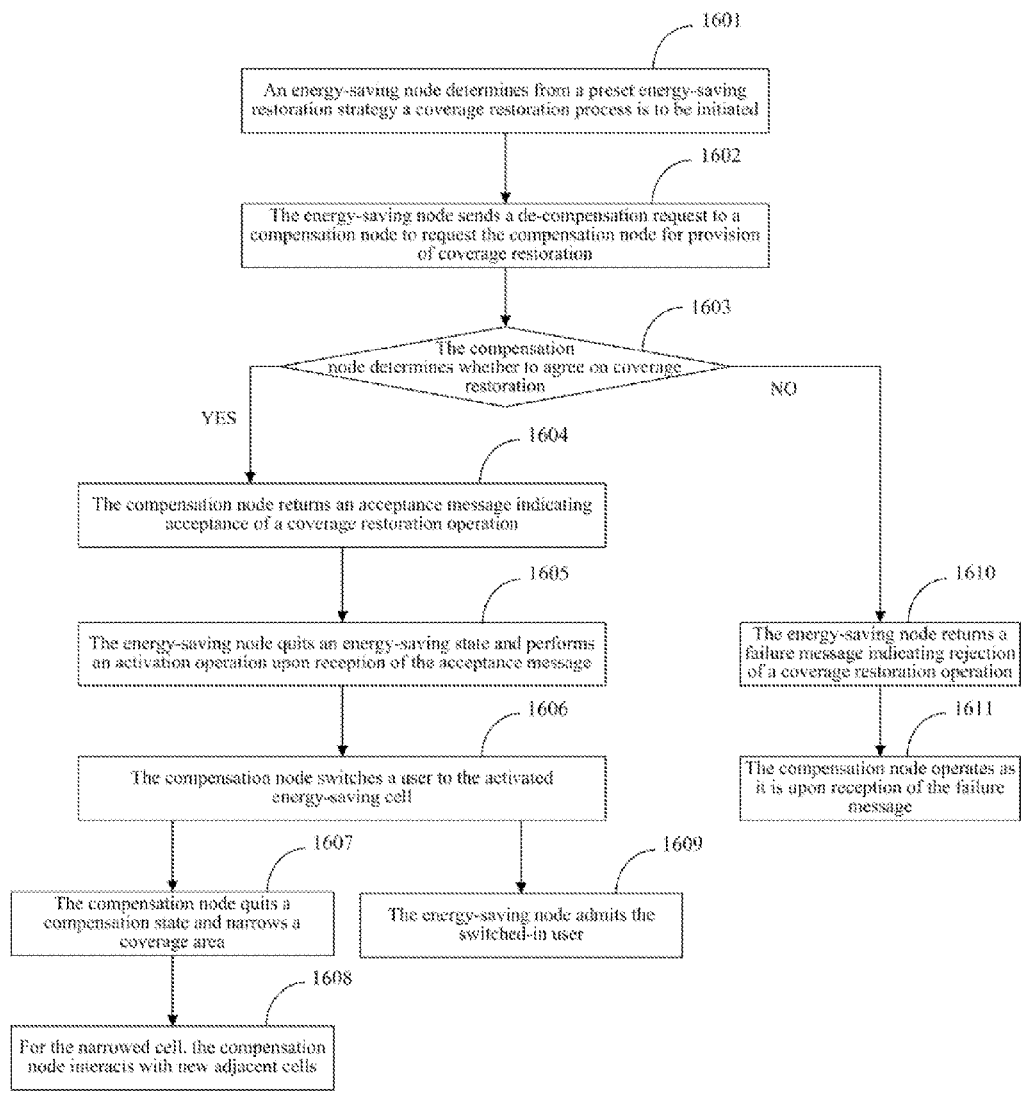
FIG. 16 is a flow chart of a method of an energy-saving node initiating coverage restoration in a one-negotiation process in an embodiment of the invention.

Referring to FIG. 16, a flow of a method of an energy-saving node initiating coverage restoration in a one-negotiation process in this embodiment is as follows:

Step 1601: An energy-saving node determines from a preset energy-saving restoration strategy a coverage restoration process is to be initiated.

Step 1602: The energy-saving node sends a de-compensation request to a compensation node to request the compensation node for provision of coverage restoration. The de-compensation request can particularly be a cell de-compensation request. The cell de-compensation request carries the identifiers of target cells requested to be activated and can further include a maximum period of time within which a target cell is activated, information related to the target cells, etc. A variety of information related to the target cells is possible, cell types, cell sizes, etc.

Step 1603: The compensation node determines whether to agree on coverage restoration from a local compensation restoration strategy and the received information related to the target cells, and if so, then the flow proceeds to the step 1604; otherwise, the flow proceeds to the step 1610. Particularly the compensation restoration strategy can be preconfigured by an OAM entity or can be exchanged between cells. Numerous compensation restoration strategies are possible, for example, it is determined whether the size of a target cell satisfies a demand of a user and the amount of data to be switched and whether the type of the target cell satisfies a service demand of the user, and if both are positive, then the compensation nodes agrees on coverage restoration. Other compensation restoration strategies are also possible and will not be enumerated here so as to avoid a repeated description thereof.

Step 1604: The compensation node returns an acceptance message indicating acceptance of a coverage restoration operation. The acceptance message can particularly be a cell de-compensation response. The cell de-compensation response includes the identifier of a cell accepting activation, that is, any cell without its corresponding cell identifier being carried will not provide a coverage restoration operation, so a failure message as returned below may not carry a cell identifier.

Step 1605: The energy-saving node quits an energy-saving state, performs an activation operation and restores a service of the cell accepting activation upon reception of the acceptance message.

Step 1606: The compensation node switches a user to the activated energy-saving cell. If there is a user, served by the compensation node, to be switched, then this step will be performed; otherwise, this step will be skipped. For whether to switch a user, reference can be made to the specification regarding a handover decision in the communication protocol.

Step 1607: The compensation node quits a compensation state and narrows a coverage area. For example, a particular operation is to lower transmission power, to adjust an inclination angle of an antenna, etc.

Step 1608: For the narrowed cell, the compensation node interacts with new adjacent cells and collects RLF and other related information of the new adjacent cells so as to further adjust transmission power and optimize the coverage area.

Step 1609: The energy-saving node admits the switched-in user.

Step 1610: The energy-saving node returns a failure message indicating rejection of a coverage restoration operation. The failure message can particularly be a cell de-compensation failure. The cell de-compensation failure may carry information indicating a reason for rejection of a coverage restoration operation.

Step 1611: The compensation node operates as it is upon reception of the failure message.

Figure 17:
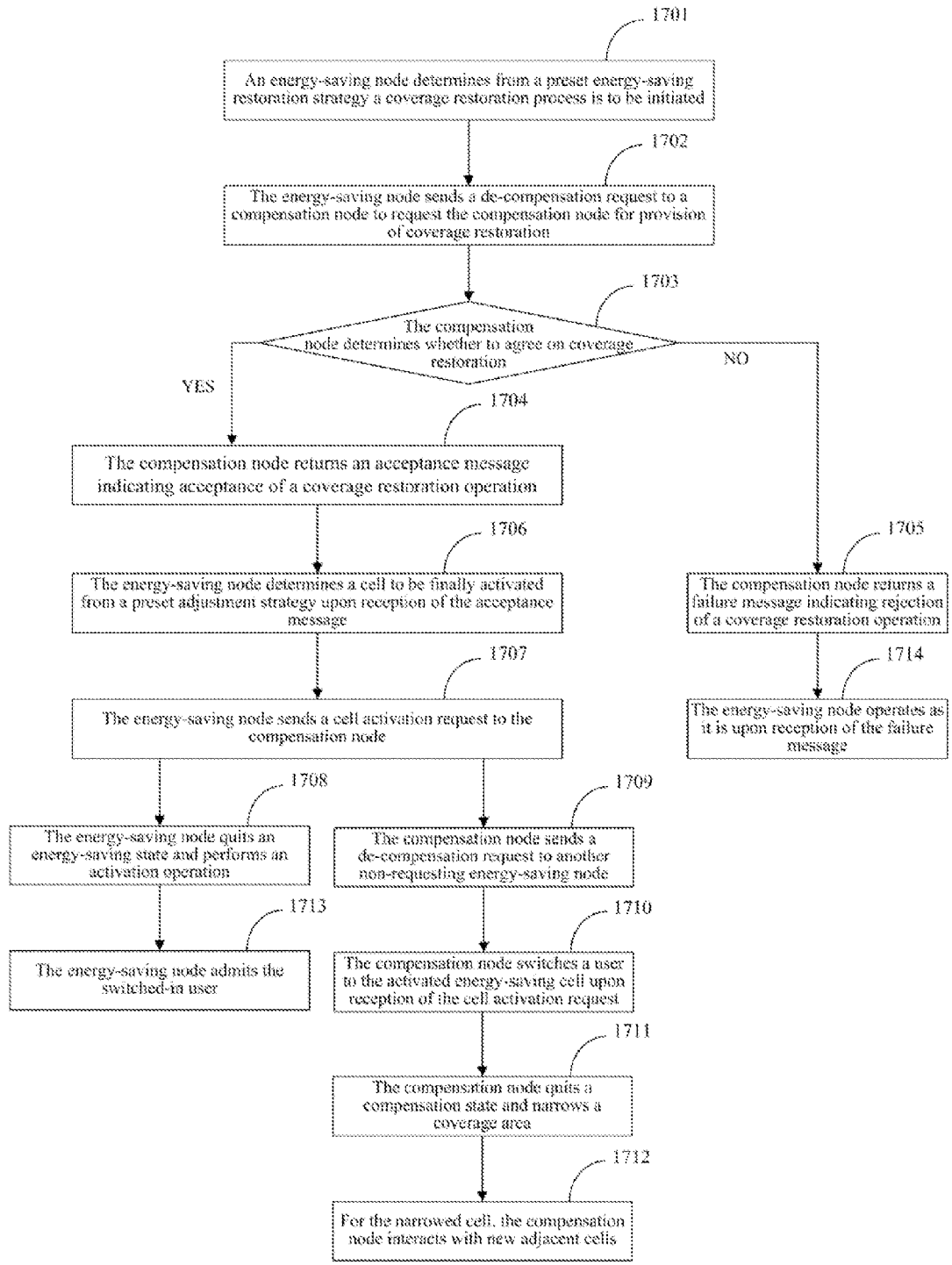
FIG. 17 is a flow chart of a method of an energy-saving node initiating coverage restoration in a two-negotiation process in an embodiment of the invention.

Referring to FIG. 17, a flow of a method of an energy-saving node initiating coverage restoration in a two-negotiation process in this embodiment is as follows:

Step 1701: An energy-saving node determines from a preset energy-saving restoration strategy a coverage restoration process is to be initiated.

Step 1702: The energy-saving node sends a de-compensation request to a compensation node to request the compensation node for provision of coverage restoration. The de-compensation request can particularly be a cell de-compensation request.

Step 1703. The compensation node determines whether to agree on coverage restoration from a local compensation restoration strategy and received information related to target cells, and if so, then the flow proceeds to the step 1704; otherwise, the flow proceeds to the step 1705.

Step 1704: The compensation node returns an acceptance message indicating acceptance of a coverage restoration operation. The acceptance message can particularly be a cell de-compensation response. The cell de-compensation response includes the identifiers of cells accepting activation, that is, any cell without its corresponding cell identifier being carried will not provide a coverage restoration operation, so a failure message as returned below may not carry a cell identifier. The cell de-compensation response can further include the number of users, the amount of data to be switched and other information.

Step 1705: The compensation node returns a failure message indicating rejection of a coverage restoration operation. The failure message can particularly be a cell de-compensation failure. The cell de-compensation failure may carry information indicating a reason for rejection of a coverage restoration operation.

Step 1706: The energy-saving node determines a cell to be finally activated from a preset adjustment strategy upon reception of the acceptance message. Numerous adjusting strategies are possible, for example, the number of users and the amount of data acceptable to switch together with cells where this part of users reside are determined from the received number of local users and amount of data to be switched and local cell types and cell sizes. Particularly the adjustment strategy can be configured by an OAM entity or can be exchanged between cells.

Step 1707: The energy-saving node sends a cell activation request to the compensation node. The cell activation request carries the cell identifier of the cell to be finally activated.

Step 1708: The energy-saving node quits an energy-saving state, performs an activation operation and restores all the functions of the cell, served by the node, to be finally activated after sending the cell activation request.

Figure 12:
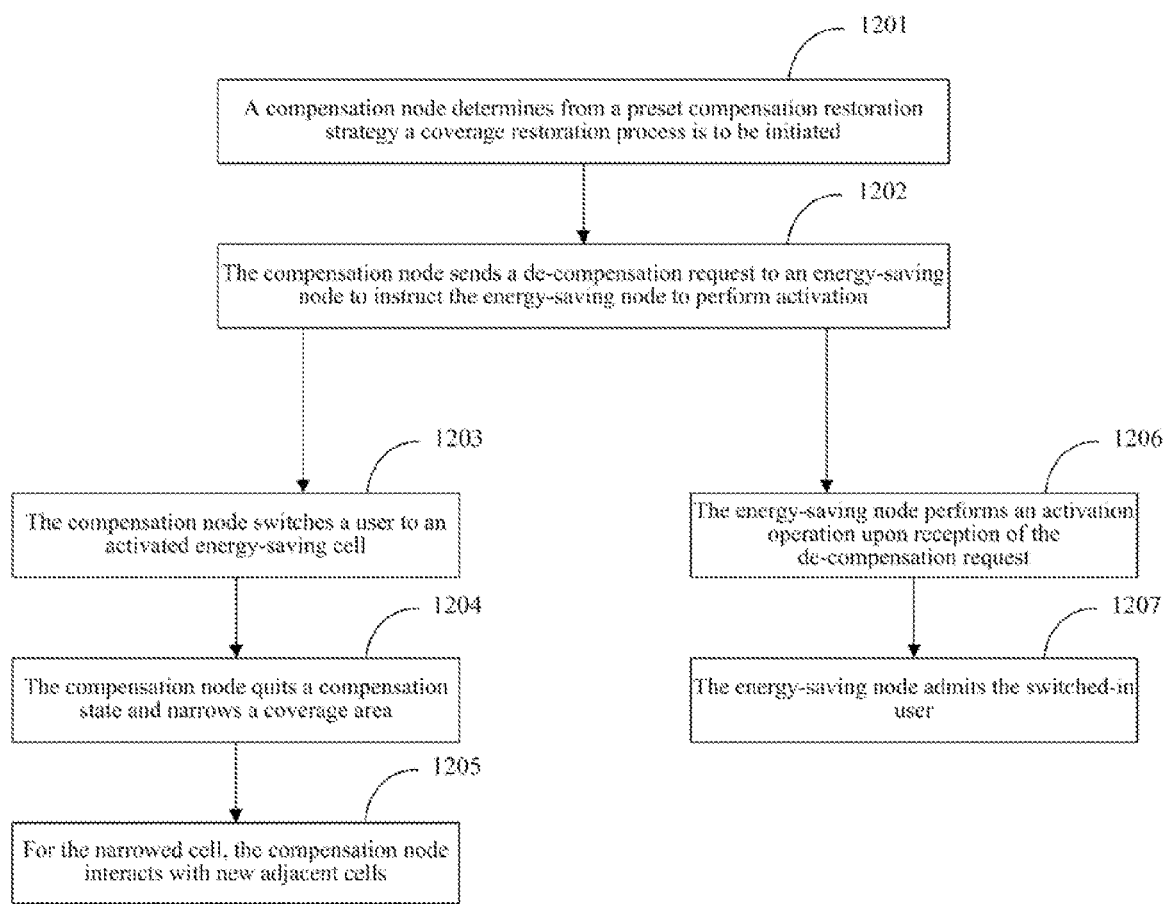
FIG. 12 is a flow chart of a method of a compensation node initiating coverage restoration in a forced process in an embodiment of the invention.

Step 1709: The compensation node sends a de-compensation request to another non-requesting energy-saving node upon reception of the cell activation request to instruct the other energy-saving node to activate a cell. The de-compensation request can be a cell de-compensation indication or a cell de-compensation request. For operations of the other energy-saving node upon reception of the de-compensation request, reference can be made to the flows illustrated in FIG. 12 to FIG. 14, i.e., the compensation restoration flows initiated by the compensation node. In this step, primarily in view of that the compensation node may have omni-directional coverage, when some cell or cells are provided with coverage restoration, its narrowed coverage area may not cover a non-requesting cell or cells and a restoration operation can also be performed on this part of cells to reduce or avoid a coverage hole from occurring. Of course the second negotiation in this embodiment includes negotiation between the compensation node and the other energy-saving node.

Step 1710: The compensation node switches a user to the activated energy-saving cell upon reception of the cell activation request. If there is a user, served by the compensation node, to be switched, then this step will be performed; otherwise, this step will be skipped. For whether to switch a user, reference can be made to the specification regarding a handover decision in the communication protocol.

Step 1711: The compensation node quits a compensation state and narrows a coverage area. For example, a particular operation is to lower transmission power, to adjust an inclination angle of an antenna, etc.

Step 1712: For the narrowed cell, the compensation node interacts with new adjacent cells and collects RLF and other related information of the new adjacent cells so as to further adjust transmission power and optimize the coverage area.

Step 1713: The energy-saving node admits the switched-in user.

Step 1714: The energy-saving node operates as it is upon reception of the failure message.

To perform a coverage restoration operation, a device initiating the coverage restoration operation will not be limited to a compensation node and an energy-saving node, but the operation can also be initiated by a third-party device, e.g., an OAM entity, and for a particular process, reference can be made to the following embodiments.

Figure 18:
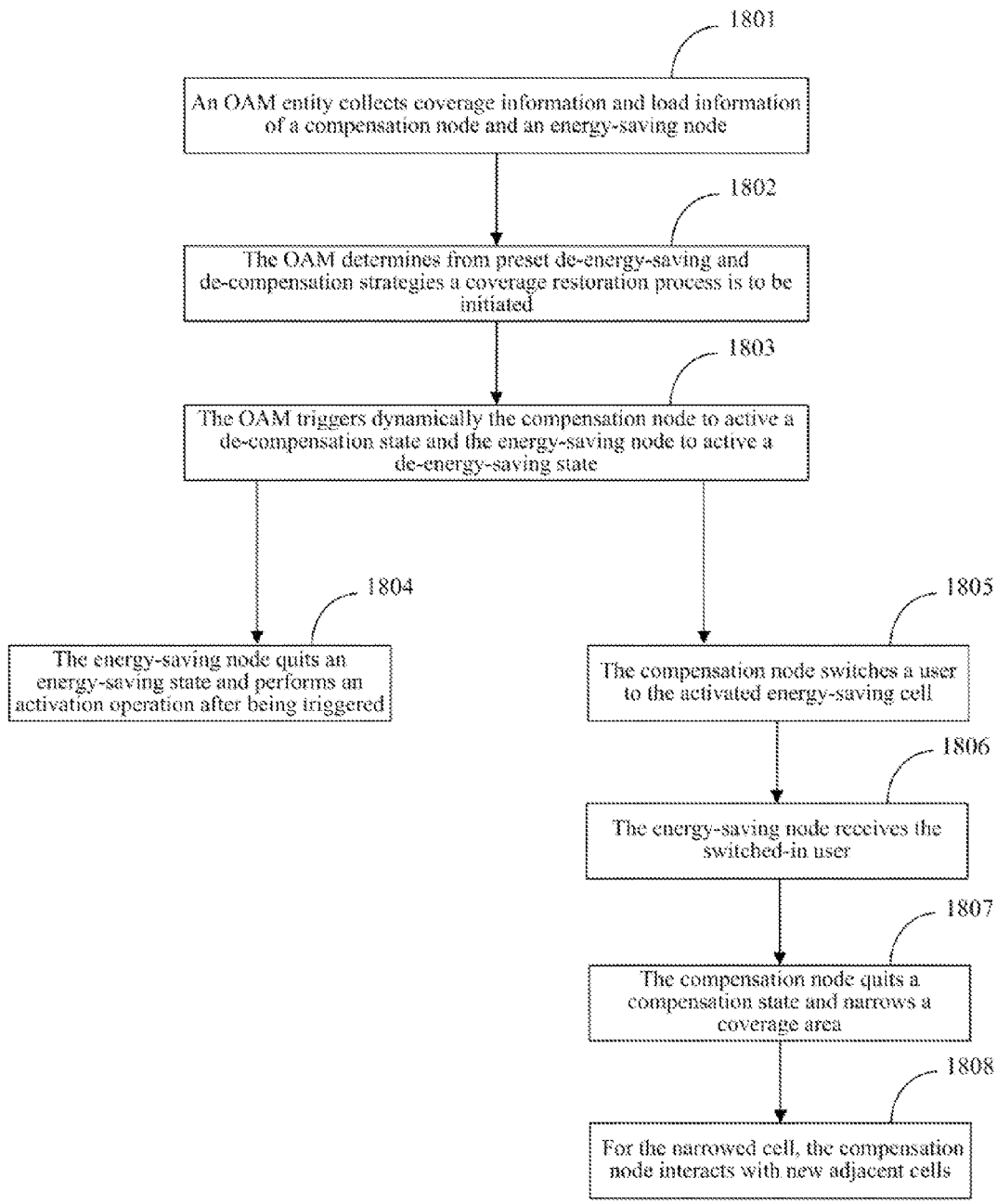
FIG. 18 is a flow chart of a method of an OAM entity initiating coverage restoration in a forced process in an embodiment of the invention.

Referring to FIG. 18, a method of an OAM entity initiating coverage restoration in a forced process in this embodiment is as follows:

Step 1801: An OAM entity collects coverage information, load information, etc., of a compensation node and an energy-saving node. This is only exemplary, and the OAM entity can collect any de-compensation related information. This step can be performed periodically or at fixed timings or under some trigger condition.

Step 1802: The OAM entity determines from preset de-energy-saving and de-compensation strategies a coverage restoration process is to be initiated. The preset de-energy-saving and de-compensation strategies can include the compensation restoration strategy of the compensation node in FIG. 12 to and/or the de-energy-saving strategy of the energy-saving node in FIG. 15 to FIG. 17.

Step 1803: The OAM entity triggers dynamically the compensation node to activate a de-compensation state and the energy-saving node to activate a de-energy-saving state. The OAM entity can trigger the de-compensation state and the de-energy-saving state particularly by sending a de-compensation request to the compensation node and the energy-saving node. The de-compensation request can particularly be a cell de-compensation indication or another configuration message.

Step 1804: The energy-saving node quits an energy-saving state, performs an activation operation and restores a service of a cell accepting activation after being triggered.

Step 1805: The compensation node switches a user to the activated energy-saving cell. If there is a user, served by the compensation node, to be switched, then this step will be performed; otherwise, this step will be skipped. For whether to switch a user, reference can be made to the specification regarding a handover decision in the communication protocol.

Step 1806: The energy-saving node admits the switched-in user.

Step 1807: The compensation node quits a compensation state and narrows a coverage area. For example, a particular operation is to lower transmission power, to adjust an inclination angle of an antenna, etc.

Step 1808: For the narrowed cell, the compensation node interacts with new adjacent cells and collects RLF and other related information of the new adjacent cells so as to further adjust transmission power and optimize the coverage area.

Figure 19:
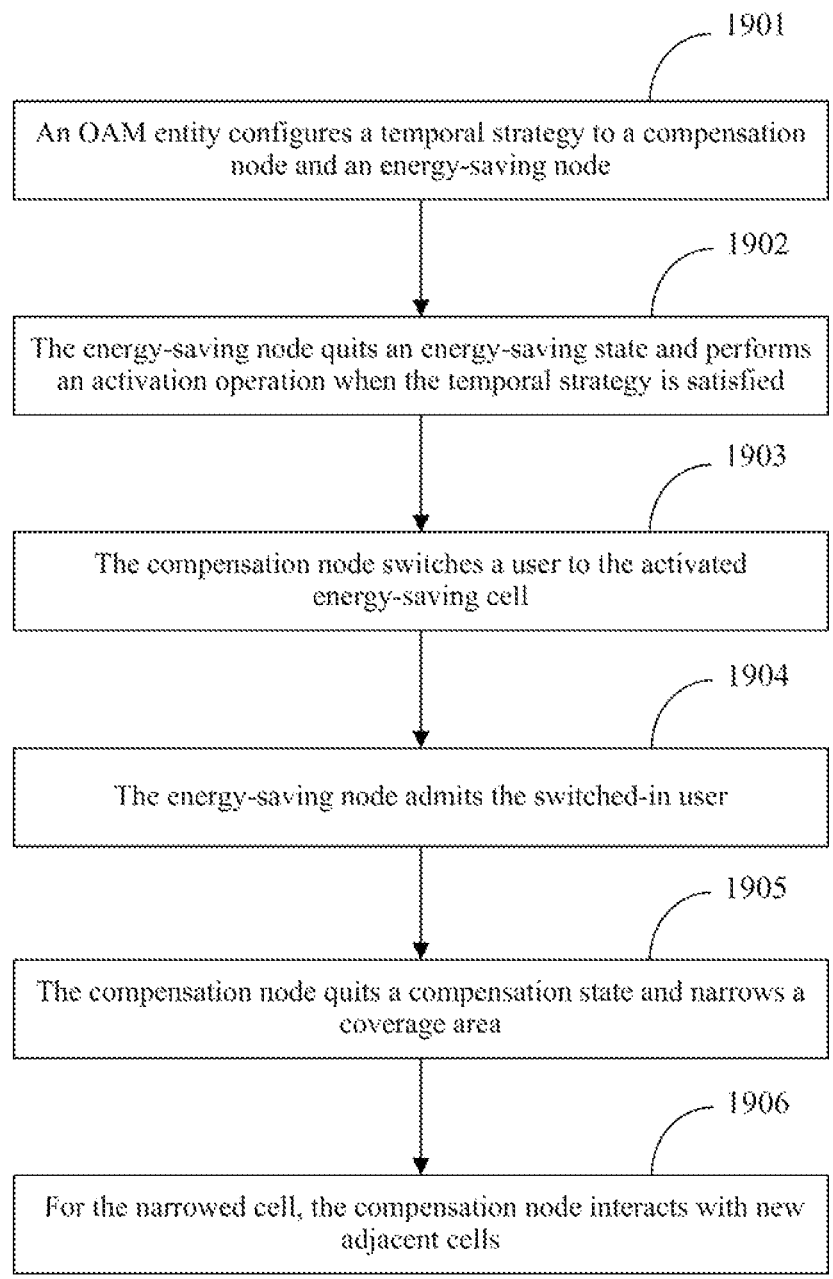
FIG. 19 is a flow chart of a method of initiating a coverage restoration process automatically after an OAM entity pre-configures energy-saving and compensation strategies in an embodiment of the invention.

Referring to FIG. 19, a flow of a method of initiating a coverage restoration process automatically after an OAM entity pre-configures energy-saving and compensation strategies is as follows:

Step 1901: An OAM entity configures a temporal strategy to a compensation node and an energy-saving node. The temporal strategy can be timings or can be periodical. For example, in a timing temporal strategy, the compensation node quits/enters a compensation state again three hours after entering/quitting the compensation state, and also the related energy-saving node is activated/deactivated three hours after being deactivated/activated. For example, in a periodical temporal strategy; the compensation node enters/quits a compensation state for a period of time of 0:00 to 7:00, and also a period of time for which the related energy-saving node enters/quits an energy-saving state can be set the same as 0:00 to 7:00. In this embodiment, the temporal strategy can be regarded as an energy-saving or compensation strategy or a part thereof.

After the temporal strategy is configured once, the following steps can be performed repeatedly.

Step 1902: The energy-saving node quits an energy-saving state, performs an activation operation and restores a service of a cell accepting activation when the temporal strategy is satisfied.

Step 1903: The compensation node switches a user to the activated energy-saving cell. If there is a user, served by the compensation node, to be switched, then this step will be performed; otherwise, this step will be skipped. For whether to switch a user, reference can be made to the specification regarding a handover decision in the communication protocol.

Step 1904: The energy-saving node admits the switched-in user.

Step 1905: The compensation node quits a compensation state and narrows a coverage area. For example, a particular operation is to lower transmission power, to adjust an inclination angle of an antenna, etc.

Step 1906: For the narrowed cell, the compensation node interacts with new adjacent cells and collects RLF and other related information of the new adjacent cells so as to further adjust transmission power and optimize the coverage area.

The foregoing introduction has been made of the coverage area compensation and restoration processes generally involving the compensation node, the energy-saving and the OAM entity, and internal structures and functions of these apparatuses will be introduced below.

Figure 20:
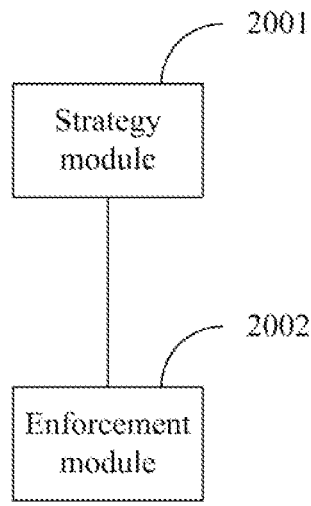
FIG. 20 is a general structural diagram of a coverage area compensation apparatus in an embodiment of the invention.

Referring to FIG. 20, a coverage area compensation apparatus in this embodiment includes a strategy module 2001 and enforcement module 2002.

The strategy module 2001 is configured to determine from preset energy-saving and compensation strategies whether a trigger condition to initiate an energy-saving and compensation process is satisfied or to receive a trigger for the energy-saving and compensation process from an OAM entity.

The enforcement module 2002 is configured to perform an energy-saving operation in the energy-saving and compensation process or to perform a compensation operation in the energy-saving and compensation process when the energy-saving and compensation process is determined to be initiated. Preferably the enforcement module 2002 performs the energy-saving operation in the energy-saving and compensation process after a preset minimum period of time after which a target cell is deactivated or performs the compensation operation in the energy-saving and compensation process within the preset minimum period of time after which a target cell is deactivated. The enforcement module 2002 performs the compensation operation at least in any one of the following ways:

A coverage area is enlarged by adjusting power of an antenna;

A coverage area is enlarged by adjusting the number of antenna ports; and

A coverage area is enlarged by adjusting an inclination angle of an antenna.

The enforcement module performs the energy-saving operation by deactivating all the other functions than a sounding function in a cell.

Particularly the apparatus is an energy-saving node when performing the energy-saving operation in the energy-saving and compensation process; and the apparatus is a compensation node when performing the compensation operation in the energy-saving and compensation process.

Figure 21:
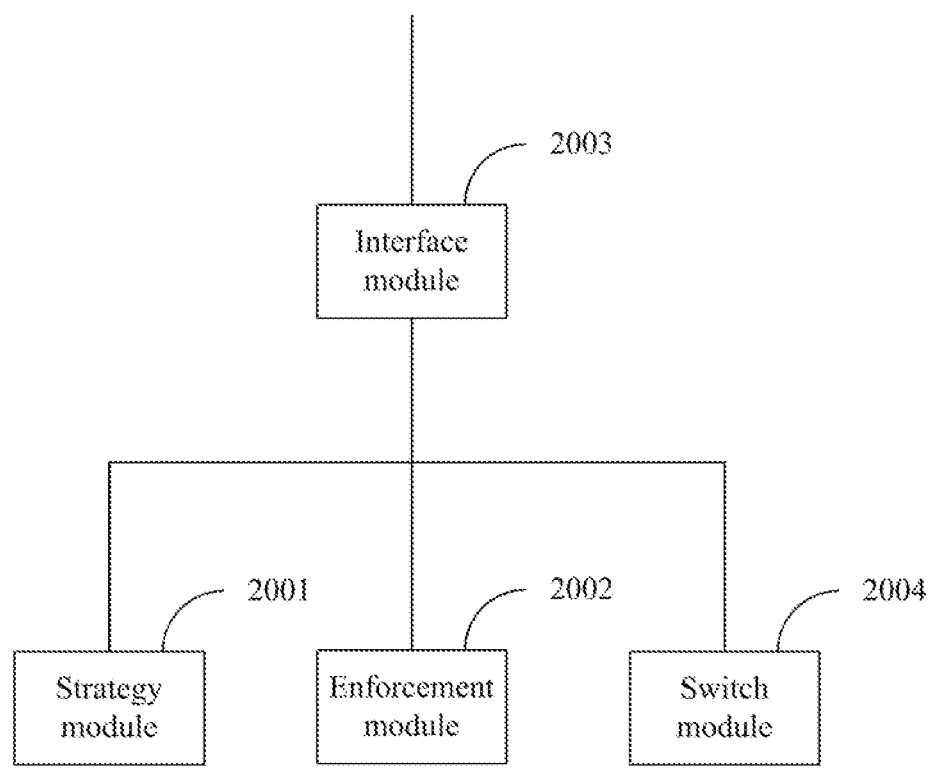
FIG. 21 is a detailed structural diagram of a coverage area compensation apparatus in an embodiment of the invention.

The apparatus further includes an interface module 2003 as illustrated in FIG. 21. The face module 2003 is configured to send a compensation request to a second node to trigger the second node to perform an energy-saving and compensation process.

The interface module 2003 is further configured to receive a cell compensation response returned from the second node. The enforcement module 2002 performs the energy-saving operation in the energy-saving and compensation process or performs the compensation operation in the energy-saving and compensation process according to the cell compensation response. Alternatively the strategy module 2001 is further configured to determine a cell for which energy-saving is finally required from the cell compensation response and an adjustment strategy upon reception of the cell compensation response. The interface module 2003 is further configured to send to the second node a cell deactivation request carrying the cell identifier of the cell to be finally deactivated.

When the apparatus is a compensation node, the interface module 2003 is further configured to send a compensation request to an adjacent energy-saving node other than the second node upon reception of a cell deactivation request.

The interface module 2003 is further configured to receive a cell compensation failure returned from the second node.

When the apparatus is a party receiving a compensation request, the strategy module 2001 is further configured to determine whether to agree on energy-saving from the preset energy-saving and compensation strategies and enlarged coverage related information in a compensation request upon reception of the compensation request. The interface module 2003 is configured to return a compensation response when energy-saving is agreed on. The interlace module 2003 is further configured to return a cell compensation failure when energy-saving is rejected. The interface module 2003 is further configured to receive a cell deactivation request after returning the cell compensation response.

The apparatus further includes a switch module 2004 configured to receive a user switched in from a target cell to be deactivated or to switch the user from the target cell to be deactivated to another cell.

Figure 22:
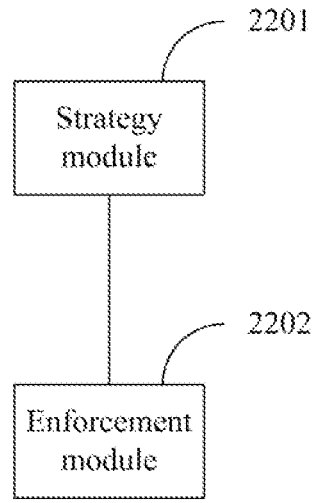
FIG. 22 is a general structural diagram of a coverage area restoration apparatus in an embodiment of the invention.

Referring to FIG. 22, a coverage area restoration apparatus in this embodiment includes a strategy module 2201 and enforcement module 2202.

The strategy module 2201 is configured to determine from preset energy-saving and compensation restoration strategies whether a trigger condition to initiate a coverage restoration process is satisfied or to receive a trigger for the coverage restoration process from an OAM entity.

The enforcement module 2202 is configured to perform an energy-saving restoration operation in the coverage restoration process or a compensation restoration operation in the coverage restoration process when the coverage restoration process is determined to be initiated. Preferably the enforcement module 2202 performs the energy-saving restoration operation in the coverage restoration process within a preset maximum period of time within which a target cell is activated or performs the compensation restoration operation in the coverage restoration process after the preset maximum period of time within which a target cell is activated.

The enforcement module 2202 performs the compensation restoration operation at least in any one of the following ways:

A coverage area is narrowed by adjusting power of an antenna;

A coverage area is narrowed by adjusting the number of antenna ports; and

A coverage area is narrowed by adjusting an inclination angle of an antenna.

The enforcement module 2202 performs the energy-saving restoration operation by activating all the deactivated functions in a cell.

Particularly the apparatus is an energy-saving node when performing the energy-saving restoration operation in the coverage restoration process; and the apparatus is a compensation node when performing the compensation restoration operation in the coverage restoration process.

Figure 23:
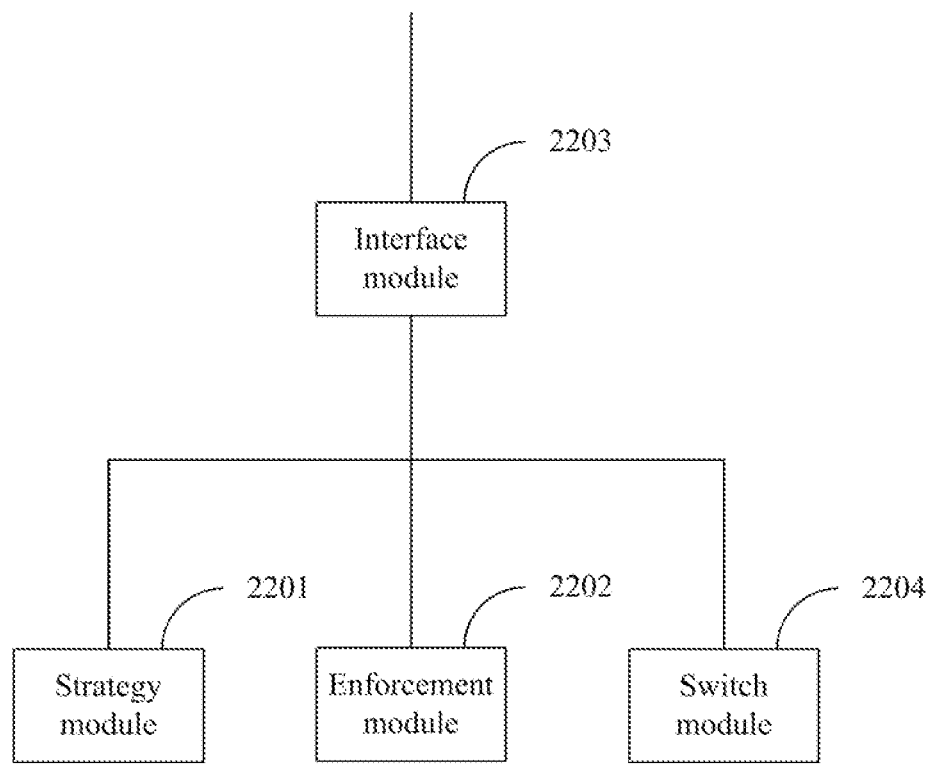
FIG. 23 is a detailed structural diagram of a coverage area restoration apparatus in an embodiment of the invention.

The apparatus further includes an interface module 2203 as illustrated in FIG. 23. The interface module 2203 is configured to send a de-compensation request to a second node to trigger the second node to perform an energy-saving and compensation restoration process.

The interface module 2203 is further configured to receive a cell de-compensation response returned from the second node. The enforcement module 2202 performs the energy-saving restoration operation in the coverage restoration process or performs the compensation restoration operation in the coverage restoration process according to the cell de-compensation response. Alternatively the strategy module 2201 is further configured to determine a cell to be finally activated from the cell de-compensation response and an adjustment strategy upon reception of the cell de-compensation response. The interface module 2203 is further configured to send to the second node a cell activation request carrying the cell identifier of the cell to be finally activated.

When the apparatus is a compensation node, the interface module 2203 is further configured to send a de-compensation request to an adjacent energy-saving node other than the second node upon reception of a cell activation request.

The interface module 2203 is further configured to receive a cell de-compensation failure returned from the second node.

When the apparatus is a party receiving a de-compensation request, the strategy module 2201 is further configured to determine whether to agree on restoration from the preset energy-saving and compensation restoration strategies and received narrowed coverage related information upon reception of the de-compensation request and to return a de-compensation response upon agreement on restoration.

The interface module 2203 is further configured to return a cell de-compensation failure when restoration is rejected.

The interface module 2203 is further configured to receive a cell deactivation request after returning the cell de-compensation response.

The apparatus further includes a switch module 2204 configured to switch a user to a target cell to be activated or to admit a switched-in user.

In this embodiment, the coverage area energy-saving apparatus and the coverage area restoration apparatus can be the same apparatus which performs an energy-saving function when energy-saving is required and performs a restoration function when restoration is required. The strategy module 2001 and the strategy module 2201 are the same module, the enforcement module 2002 and the enforcement module 2202 are the same module, the interface module 2003 and the interface 2203 are the same module, and the switch module 2004 and the switch module 2204 are the same module.

Figure 24:
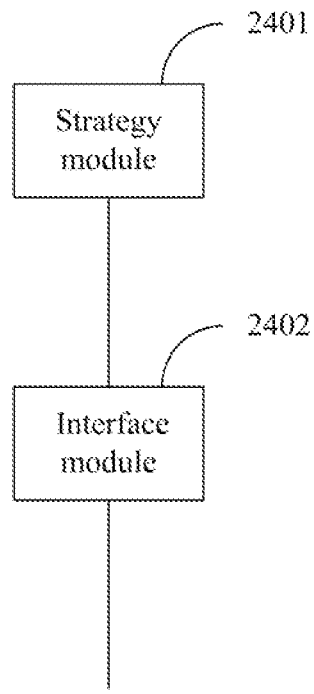
FIG. 24 is a structural diagram of an OAM entity performing energy-saving and compensation in an embodiment of the invention.

Referring to FIG. 24, an OAM entity in this embodiment includes a strategy module 2401 and an interface module 2402.

The strategy module 2401 is configured to determine from preset energy-saving and compensation strategies whether a trigger condition to initiate an energy-saving and compensation process is satisfied.

The interface module 2402 is configured to trigger a first node and a second node to perform the energy-saving and compensation process when the energy-saving and compensation process is determined to be initiated. The interface module 2402 is further configured to collect coverage information and load information of the first node and the second node.

Particularly the first node is a compensation node, and the second node is an energy-saving node; or the first node is an energy-saving node, and the second node is a compensation node.

Figure 25:
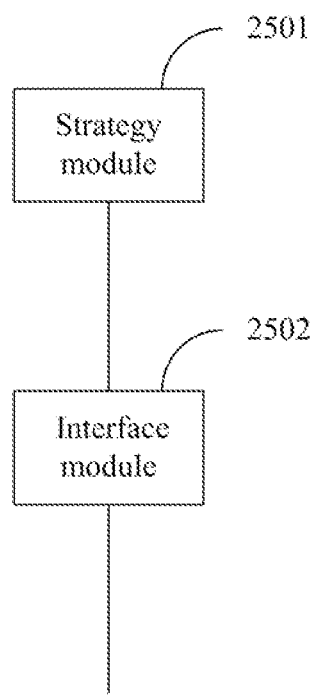
FIG. 25 is a structural diagram of an OAM entity performing energy-saving and compensation restoration in an embodiment of the invention.

Referring to FIG. 25, an OAM entity in this embodiment includes a strategy module 2501 and an interface module 2502.

The strategy module 2501 is configured to determine from preset energy-saving and compensation restoration strategies whether a trigger condition to initiate a coverage restoration process is satisfied.

The interface module 2502 is configured to trigger a first node and a second node to perform the coverage restoration process when the coverage restoration process is determined to be initiated. The interface module 2502 is further configured to collect load information and coverage information of the first node and the second node.

Particularly the first node is a compensation node, and the second node is an energy-saving node; or the first node is an energy-saving node, and the second node is a compensation node.

The OAM entity in FIG. 24 and the OAM entity in FIG. 25 can be the same apparatus which performs an energy-saving function when energy-saving is required and performs a restoration function when restoration is required. The strategy module 2401 and the strategy module 2501 are the same module, and the interface module 2402 and the interface 2502 are the same module.

A node in an embodiment of the invention sends a compensation request to another related node when an energy-saving or compensation strategy is satisfied so that the node sending the request and the other related node perform an energy-saving or compensation operation to implement energy-saving and compensation between the nodes. Various implementations are provided in embodiments of the invention, so that a de-energy-saving or restoration process can be initiated by a compensation node, an energy-saving node or an OAM entity, and a forced or negotiation process can be performed between the compensation node and the energy-saving node to accommodate a demand in different scenarios.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention, it shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A coverage area compensation method, comprising:
   determining from a preset energy-saving and compensation strategy whether a trigger condition to initiate an energy-saving and compensation process is satisfied; and
   a first node performing an energy-saving operation in the energy-saving and compensation process after a minimum period of time after which a target cell is deactivated and a second node performing a compensation operation in the energy-saving and compensation process within the minimum period of time after which the target cell is deactivated, when the trigger condition to initiate the energy-saving and compensation process is satisfied.

2. The method according to claim 1, wherein the determining from the preset energy-saving and compensation strategy whether the trigger condition to initiate the energy-saving and compensation process is satisfied comprises: the first node determining from the preset energy-saving and compensation strategy whether the trigger condition to initiate the energy-saving and compensation process is satisfied; and
   before the first node performs the energy-saving operation in the energy-saving and compensation process and the second node performs the compensation operation in the energy-saving and compensation process, the method further comprises: the first node sending a compensation request to the second node to trigger the second node to perform the energy-saving and compensation process.

3. The method according to claim 2, wherein the compensation request is a cell compensation indication or a cell compensation request carrying a cell identifier of the target cell requested to be deactivated and the minimum period of time after which the target cell is deactivated.

4. The method according to claim 3, wherein when the compensation request is a cell compensation request, the compensation request further comprises enlarged coverage related information; and
   before the first node performs the energy-saving operation in the energy-saving and compensation process and the second node performs the compensation operation in the energy-saving and compensation process, the method further comprises: the second node determining whether to agree on energy-saving from a preset energy-saving and compensation strategy and the received enlarged coverage related information upon reception of the compensation request; and returning a cell compensation response to the first node upon agreement on energy-saving.

5. The method according to claim 4, wherein the cell compensation response comprises the cell identifier of the target cell accepting energy-saving.

6. The method according to claim 1, wherein the determining from the preset energy-saving and compensation strategy whether the trigger condition to initiate the energy-saving and compensation process is satisfied comprises: a third node determining from the preset energy-saving and compensation strategy whether the trigger condition to initiate the energy-saving and compensation process is satisfied; and
   before the first node performs the energy-saving operation in the energy-saving and compensation process and the second node performs the compensation operation in the energy-saving and compensation process, the method further comprises: the third node triggers the first node and the second node to perform the energy-saving and compensation process.

7. The method according to claim 6, wherein before the third node determines from the preset energy-saving and compensation strategy whether the trigger condition to initiate the energy-saving and compensation process is satisfied, the method further comprises: the third node collecting coverage information and load information of the first node and the second node.

8. The method according to claim 1, wherein the determining from the preset energy-saving and compensation strategy whether the trigger condition to initiate the energy-saving and compensation process is satisfied comprises: the first node and the second node respectively determining from the preset energy-saving and compensation strategy whether the trigger condition to initiate the energy-saving and compensation process is satisfied.

9. The method according to claim 1, wherein the compensation operation comprises at least one of:
   enlarging a coverage area by adjusting power of an antenna;
   enlarging a coverage area by adjusting the number of antenna ports; and
   enlarging a coverage area by adjusting an inclination angle of an antenna; and
   the energy-saving operation comprises deactivating all other functions than a sounding function in a cell.

10. A coverage area restoration method, comprising:
    determining from a preset energy-saving and compensation restoration strategy whether a trigger condition to initiate a coverage restoration process is satisfied; and
    a first node performing an energy-saving restoration operation in the coverage restoration process within a maximum period of time within which a target cell is activated and a second node performing a compensation restoration operation in the coverage restoration process after the maximum period of time within which the target cell is activated, when the trigger condition to initiate the coverage restoration process is satisfied.

11. The method according to claim 10, wherein the determining from the preset energy-saving and compensation restoration strategy whether the trigger condition to initiate the coverage restoration process is satisfied comprises: the first node determining from the preset energy-saving and compensation restoration strategy whether the trigger condition to initiate the coverage restoration process is satisfied; and
    before the first node performs the energy-saving restoration operation in the coverage restoration process and the second node performs the compensation restoration operation in the coverage restoration process, the method further comprises: the first node sending a de-compensation request to the second node to trigger the second node to perform the coverage restoration process.

12. The method according to claim 11, wherein the de-compensation request is a cell de-compensation indication or a cell de-compensation request carrying a cell identifier of the target cell requested to be activated and the maximum period of time within which the target cell is activated.

13. The method according to claim 12, wherein when the de-compensation request is a cell de-compensation request, the de-compensation request further comprises narrowed coverage related information; and before the first node performs the energy-saving restoration operation in the coverage restoration process and the second node performs the compensation restoration operation in the coverage restoration process, the method further comprises: the second node determining whether to agree on restoration from a preset energy-saving and compensation restoration strategy and the received narrowed coverage related information upon reception of the de-compensation request, and returning a cell de-compensation response to the first node upon agreement on restoration.

14. The method according to claim 13, wherein the cell de-compensation response comprises the cell identifier of the target cell accepting activation.

15. The method according to claim 10, wherein the determining from the preset energy-saving and compensation restoration strategy whether the trigger condition to initiate the coverage restoration process is satisfied comprises: a third node determining from the preset energy-saving and compensation restoration strategy whether the trigger condition to initiate the coverage restoration process is satisfied; and before the first node performs the energy-saving restoration operation in the coverage restoration process and the second node performs the compensation restoration operation in the coverage restoration process, the method further comprises: the third node triggers the first node and the second node to perform the coverage restoration process.

16. The method according to claim 15, wherein before the third node determines from the preset energy-saving and compensation restoration strategy whether the trigger condition to initiate a coverage restoration process is satisfied, the method further comprises: the third node collecting coverage information and load information of the first node and the second node.

17. The method according to claim 10, wherein the determining from the preset energy-saving and compensation restoration strategy whether the trigger condition to initiate the coverage restoration process is satisfied comprises: the first node and the second node respectively determining from the preset energy-saving and compensation restoration strategy whether the trigger condition to initiate the coverage restoration process is satisfied.

18. The method according to claim 10, wherein before the first node performs the energy-saving restoration operation in the coverage restoration process and the second node performs the compensation restoration operation in the coverage restoration process, the method further comprises: the second node switching a user to a cell served by the node intended to perform the energy-saving restoration operation.

19. The method according to claim 10, wherein the compensation restoration operation comprises at least one of:
narrowing a coverage area by adjusting power of an antenna;
narrowing a coverage area by adjusting the number of antenna ports; and
narrowing a coverage area by adjusting an inclination angle of an antenna; and
the energy-saving restoration operation comprises activating all deactivated functions in a cell.

20. A coverage area compensation apparatus, comprising:
a strategy module configured to determine from a preset energy-saving and compensation strategy whether a trigger condition to initiate an energy-saving and compensation process is satisfied or to receive a trigger for the energy-saving and compensation process from an Operation, Administration and Maintenance, OAM, entity; and
an enforcement module configured to perform an energy-saving operation in the energy-saving and compensation process after a minimum period of time after which a target cell is deactivated or to perform a compensation operation in the energy-saving and compensation process within the minimum period of time after which the target cell is deactivated, when the energy-saving and compensation process is determined to be initiated,
wherein the apparatus is an energy-saving node when performing the energy-saving operation in the energy-saving and compensation process; and the apparatus is a compensation node when performing the compensation operation in the energy-saving and compensation process.

* * * * *